(12) United States Patent
Noguchi et al.

(10) Patent No.: US 6,618,210 B2
(45) Date of Patent: Sep. 9, 2003

(54) ZOOM LENS SYSTEM AND IMAGE PICKUP APPARATUS HAVING THE SAME

(75) Inventors: Azusa Noguchi, Hachioji (JP); Toyoharu Hanzawa, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/898,307

(22) Filed: Jul. 5, 2001

(65) Prior Publication Data

US 2002/0051301 A1 May 2, 2002

(30) Foreign Application Priority Data

Jul. 7, 2000 (JP) ........................................ 2000-206757
Jul. 13, 2000 (JP) ........................................ 2000-212773

(51) Int. Cl.[7] ............................................. G02B 15/14
(52) U.S. Cl. ..................................................... 359/689
(58) Field of Search .................................. 359/683, 689, 359/690

(56) References Cited

U.S. PATENT DOCUMENTS 5,442,484 A * 8/1995 Shikawa ..................... 359/689

FOREIGN PATENT DOCUMENTS

| JP | 11052246 A | 2/1999 |
|---|---|---|
| JP | 11-194274 | 7/1999 |
| JP | 11258507 A | 9/1999 |
| JP | 11-287953 | 10/1999 |

* cited by examiner

Primary Examiner—Scott J. Sugarman
(74) Attorney, Agent, or Firm—Pillsbury Winthrop LLP

(57) ABSTRACT

A zoom lens system which includes a first lens unit having negative refractive power, a second lens unit having positive refractive power and a third lens unit having positive refractive power, and is configured to change a magnification from a wide-angle position to a telephoto position by moving the second lens unit along an optical axis on the object side and moving the third lens unit along the optical axis in which said second lens unit consists of four lens elements including, in order from the object side, two positive lens elements and a negative lens element, and which can be focused by moving a third lens unit, and in which each lens unit is thin and which is thin as a whole, and an image pickup apparatus which uses this zoom lens system and has a shallow depth.

33 Claims, 17 Drawing Sheets

ZOOM LENS SYSTEM AND IMAGE PICKUP APPARATUS HAVING THE SAME

BACKGROUND OF THE INVENTION

1. Field of the Invention

The present invention relates to a zoom lens system which is thin in a direction of depth and an image pickup apparatus such as a video camera, a digital camera or the like which has the zoom lens system.

2. Description of the Prior Art

Digital camera (electronic cameras) have recently been attracting attentions as cameras of a next generation which are to substitute for a silver salt 35 mm film (the so-called Leica size) camera.

These digital cameras are known as cameras ranging from high performance cameras for business to portable prevailing type.

For realizing a portable prevailing type video camera forming an object of the present invention, a video camera or a digital camera which provides a high quality image and is thin in a direction of depth in particular, a key lies in shortening a distance as measured from a most object side surface to an image pickup surface of an optical system, a zoom optical system in particular.

These have recently been known image pickup apparatuses (cameras) which have collapsible mount type lens barrels which allow optical systems to be pushed out of camera bodies at a photographing time and to be accommodated into the camera bodies at a carrying time.

However, thicknesses of these cameras having the collapsible mount type lens barrels in conditions where optical systems are collapsed are largely different dependently on types of the optical systems and filters used.

The so-called positive lens unit leading type zoom lens system in which a lens unit disposed on a most object side in an optical system has positive refractive power as in a lens system disclosed by Japanese Laid-Open Patent Application No. Hei 11-258507 for setting high specifications for a zoom ratio, an F number and the like in particular uses thick lens elements, has large dead spaces and cannot have a thickness so small even in a collapsed condition.

In contrast, a negative lens unit leading type zoom lens system in which a negative lens unit is disposed on a most object side and which consists of two or three lens unit are disposed is advantageous for adopting a collapsible mount type lens barrel.

Furthermore, a zoom lens system disclosed by Japanese Laid-Open Patent Application No. Hei 11-52246 cannot thin a thickness of a camera even in a collapsed condition since the zoom lens system uses lens units each of which comprises a large number of lens components and in which a positive lens component is disposed on a most object side.

Out of currently known zoom lens systems, those which are disclosed by Japanese Laid-Open Patent Application No. Hei 11-194274. No. Hei 11-287953 and No-2000-1997 are suited for use with cameras using electronic image pickup devices, have favorable imaging performance such as zoom ratios, F numbers and the like, and provide smallest collapsed thickness.

Though it is proper to shallow a location of an entrance pupil for thinning a first lens unit in each of these conventional examples, a lens unit is obliged to have an enhanced magnification. When the second lens unit has the enhanced magnification and a large share of refractive power of a lens system as a whole, however, it is impossible to thin the second lens unit itself, difficult to correct aberrations and undesirably enlarge influences due to manufacturing errors.

Furthermore, it is proper to configure an image pickup device compact for configuring a camera thin and compact, but it is necessary for compact configuration of the image pickup device without changing a number of picture elements to arrange the picture elements at a narrower pitch and make up for an insufficient sensitivity with an optical system. Furthermore, the compact configuration of the is not preferable since such a configuration allows diffraction to produce an influence.

SUMMARY OF THE INVENTION

An object of the present invention is to provide a zoom lens system comprising, in order from the object side, a first lens unit having negative refractive power, a second lens unit having positive refractive power and a third lens unit having positive refractive power, wherein the second lens unit is moved only on the object side along an optical axis to change a magnification from a wide-angle position to a telephoto position, wherein the second lens unit consists of four lens elements including, in order from the object side, two positive lens elements and a negative lens element, and satisfies the following conditions (1) and (2).

$$1.3 < |\beta 23T| < 2.0 \tag{1}$$

$$0.25 < |f2/f3| < 1.5 \tag{2}$$

An object of the present invention is to provide a zoom lens system having the above described composition, wherein the second lens unit consists of four lens elements including, in order from the object side, a positive lens element, and a cemented lens component consisting of a positive lens element and a negative lens element.

Another object of the present invention is to provide a zoom lens system comprising, in order from the object side, a first lens unit having negative refractive power, a second lens unit having positive refractive power and a third lens unit having positive refractive power, wherein the above described third lens unit is moved so as to prolong a distance from the above described third lens unit to an image surface to change a magnification from a wide-angle position to a telephoto position, and wherein the above described third lens unit consists only of a positive lens component, and satisfies the following conditions (11), (12), (13) and (14):

$$|fw/f_{2R}| < 0.1 \tag{11}$$

$$0.89 < f3/fT < 2.8 \tag{12}$$

$$1.2 < |\beta 23T| < 2.0 \tag{13}$$

$$1/\beta 2T < 0.25 \tag{14}$$

Another object of the present invention is to provide an image pickup apparatus comprising a zoom lens system and an image pickup device. The zoom lens system comprises, in order from the object side, a first lens unit having negative refractive power, a second lens unit having positive refractive power and a third lens unit having positive refractive power, wherein the second lens unit is moved only on the object side to change a magnification from a wide-angle position to a telephoto position, and wherein the above described the second lens unit consists of four lens element including, in order from the object side, two positive lens elements and a negative lens element and satisfies the following conditions (1) and (2):

$$1.3 < |\beta 23T| < 2.0 \quad (1)$$

$$0.25 < |f2/f3| < 1.5 \quad (2)$$

Another object of the present invention is to provide an image pickup apparatus comprising a zoom lens system and an image pickup device, wherein the zoom lens system comprises, in order from the object side, a first lens unit having negative refractive power, a second lens unit having positive refractive power and a third lens unit having positive refractive power, wherein the above described third lens unit is moved so as to prolong a distance from the above described third lens unit to am image surface to change a magnification from a wide-angle position to a telephoto position, and wherein the above described third lens unit consists of a positive lens component, and satisfies the following conditions (11), (12), (13) and (14):

$$|fw/f_{2R}| < 0.1 \quad (11)$$

$$0.89 < f3/fT < 2.8 \quad (12)$$

$$1.1 < |\beta 23T| < 2 \quad (13)$$

$$1/\beta 2T < 0.25 \quad (14)$$

DETAILED DESCRIPTION OF THE PREFERRED EMBODIMENTS

Figure 1:
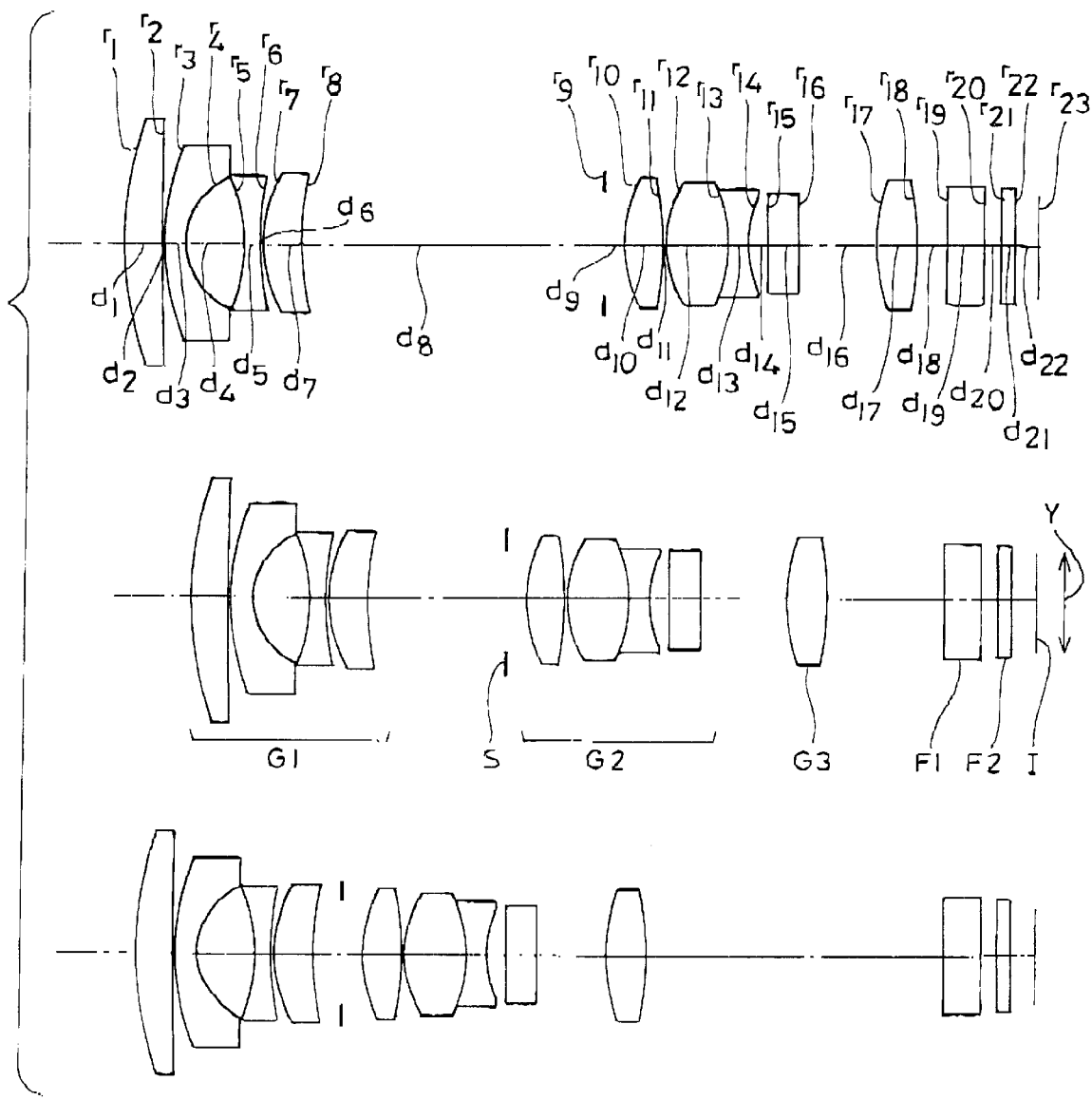
FIGS. 1 through 12 are sectional views showing compositions of first through twelfth embodiments of the present invention.

A zoom lens system which has a first composition according to the present invention is characterized in that the zoom lens system consists, in order from the object side, of a first long unit having negative refractive power, a second lens unit having positive refractive power and a third lens unit having positive refractive power, that the second lens unit is moved monotonously on the object side along an optical axis and the third lens unit is moved along the optical axis to change a magnification from a wide-angle position to a telephoto position, and wherein the second lens unit consists of four lens elements including, in order from the object side, two positive lens elements and a negative lens element, and satisfies the following conditions (1) and (2):

$$1.3 < |\beta 23T| < 2.0 \quad (1)$$

$$0.25 < f2/f3 < 1.5 \quad (2)$$

wherein a reference symbol β23T represents a total magnification of the second lens unit and the third lens unit at the telephoto position, and reference symbols f2 and f3 designate focal lengths of the second lens unit and the third lens unit respectively.

The zoom lens system according to the present invention is suited for use with an electronic image pickup apparatus having an electronic image pickup device such as a digital camera.

For the electronic image pickup device, it is necessary to allow rays to be incident on an image pickup surface at angles as small as possible.

For this reason, the zoom lens system according to the present invention is a zoom lens system which is to be used in a silver salt camera and consists of two lens units, in order from the object side, a negative lens unit and a positive lens unit, a positive lens unit, uses a most object side positive lens component as a third lens unit, and move the third lens unit independently.

That is, the zoom lens system which has the first composition according to the present invention comprises, in order from the object side, the first negative lens unit, the second positive lens unit and the third positive lens unit, and changes the magnification from the wide-angle position at which the zoom lens system is focused on an object located at an infinite distance to the telephoto position by moving the first lens unit along the optical axis, the second lens unit monotonously on the object side and the third lens unit for a distance different from a moving distance of the second lens unit.

In order to reduce an outside diameter, a total length and a thickness of the zoom lens system according to the present invention while enhancing a vari-focal ratio, the total magnification β23T of the second lens unit and the third lens unit at a telephoto position at which the zoom lens system is focused on an object located at an infinite distance is defined so as to satisfy the above mentioned condition (1).

An absolute value of the magnification β23T which is as large as possible can shallow a location of an entrance pupil at the wide-angle position, thereby facilitating to reduce an outside diameter of the first lens unit and thin the first lens unit.

If a lower limit of 1.3 of the condition (1) is exceeded, it will be difficult to reduce a thickness of the first lens unit to a satisfactory degree. If an upper limit of 2.0 of the condition (1) is exceeded, in contrast, it will be difficult to correct aberrations such as spherical aberration, coma and astigmatism.

In order to configure the zoom lens system more compact and thinner, it is preferable to satisfy, in place of the condition (1), the following condition (1-1):

$$1.4 < |\beta 23T| < 1.9 \quad (1-1)$$

The condition (2) is defined for distributing the positive refractive power of the second lens unit and the third lens unit appropriately between these lens units.

When f2/f3 has a small value, the second lens unit has a short focal length, thereby providing an advantage for shortening a total length of the second lens unit. If the focal length of the second lens unit is too short and exceeds a lower limit of 0.25 of the condition (2), however, the second lens unit will have a large share of refractive power, thereby making it difficult to correct aberrations. Furthermore, since the third lens unit will have weak refractive power, a total length of the third lens unit must be prolonged for reducing an angle of incidence of an imaging ray on an image pickup surface, thereby prolonging a total length of the lens system.

When f2/f3 has a large value, on the other hand, the third lens unit has strong refractive power and it is possible to shorten the total length while reducing the angle of incidence on the image pickup surface. If f2/f3 has a value exceeding an upper limit of 1.5 of the condition (2), however, the second lens unit will have a long focal length, thereby prolonging a total length of the second lens unit. Furthermore, since the third lens unit will have too short a focal length, aberrations will be aggravated and a number of lens elements must be increased contrary to a compact configuration.

Furthermore, it is desirable to satisfy, in place of the condition (2), the following condition (2-1):

$$0.35 < f2/f3 < 1.0 \tag{2-1}$$

In recent year where an electronic image pickup device is compact and has a large number of picture elements, an image pickup optical system must have high optical performance. The second lens unit of the zoom lens system according to the present invention consists of four lens elements including, in order from the object side, two positive lens elements and a negative lens element. This composition of the second lens unit makes it possible to correct aberrations sufficiently and obtain high optical performance.

Furthermore, remarkably aberrations are produced when the positive lens element and the negative lens element which are disposed as a second object side lens element and a third object side lens element are miscentered to each other. Accordingly, it is preferable to cement these lens elements to each other for maintaining favorable optical performance of the lens system. Furthermore, it is advantageous for correction of chromatic aberration to compose a cemented lens component by cementing these positive lens element and negative lens element to each other.

Furthermore, a lens system of a type similar to the zoom lens system according to the present invention hardly allows a front lens element to have a large diameter, thereby providing a merit that integration of an aperture stop with a second lens unit results in simplification of a mechanism, dead spaces hardly formed in a collapsed condition and reduction of a difference between F numbers at a wide-angle position and a telephoto position.

For the zoom lens system according to the present invention, it is preferable to compose a most image side lens element in the second lens unit so as to satisfy the following condition (3):

$$|fw/f_{2R}| < 0.29 \tag{3}$$

wherein a reference symbol $f_{2R}$ represents a focal length of the most image side lens elements and a reference symbol fw designates a focal length of the lens system as a whole at the wide-angle position.

If the focal length of the most image side lens element in the second lens unit is too short to satisfy the condition (3), this lens element will have a short radius of curvature and a large thickness, thereby prolonging a total length of the lens system.

The most image side lens element in the second lens unit serves for shortening the total length of the lens system when the lens element is configured so as to satisfy, in place of the condition (3), the following condition (3-1):

$$|fw/f_{2R}| < 0.25 \tag{3-1}$$

This thin configuration of the lens system is contrary to correction of aberrations as described above. In order to correct aberrations favorably in the lens system which is configured thin, it is preferable to used an aspherical surface in the second lens unit. Use of an aspherical surface is effective for correcting spherical aberration in particular, thereby resulting in an advantage for correction of astigmatism and longitudinal chromatic aberrations.

When an aspherical surface is to be disposed in the second lens unit, it is preferable to use an aspherical surface as any surface of two object side positive lens elements which exhibits a high effect for correction of spherical aberration and coma. Furthermore, it is effective for favorable correction of offaxial aberrations to use an aspherical surface on a most image side positive lens element or negative lens element which is effective for correcting the offaxial aberrations. Alternately, two or more aspherical surfaces may be disposed on the above described three positive lens elements.

In order to correct aberrations favorably over an entire range from the wide-angle position to the telephoto position or the zoom lens system according to the present invention, it is desirable to satisfy the following conditions (4) and (5):

$$0.25 < |R22F|/f2 < 1.0 \tag{4}$$

$$0.30 < |R23R|/f2 < 1.2 \tag{5}$$

wherein a reference symbol R22F represents a radius of curvature on an object side surface of a second object side lens element (positive lens element) in the second lens unit and a reference symbol R23R designates a radius of curvature on an image side surface of a third object side lens element (negative lens element) in the second lens unit.

The conditions (4) and (5) are required for maintaining the lens system thin while correcting aberrations favorably in the lens system.

The condition (4) defines the radius or curvature on the object side surface of the second object side lens element (positive lens element) in the second lens unit relative to the focal length f2 of the second lens unit, and the condition (5) defines the radius of curvature on the image side surface of the third object side lens element (negative lens element) in the second lens unit relative to the focal length f2 of the second lens unit.

A smaller value of the radius of curvature R23R of the third object side lens element is more advantageous for correction of spherical aberration in the second lens unit. When R23R has a small value, however, negative power of strengthened and positive power must be compensated by shortening the radius of curvature |R22F| on the object side surface of the second lens element in the second lens unit.

If a lower limit of 0.25 of the condition (4) is exceeded, coma is aggravated at the telephoto position, thereby degrading imaging performance as a whole. Furthermore, the radius of curvature on the object side convex surface of the second lens element in the second lens unit must be shortened, whereby the second lens element (positive lens element) is thickened, has low workability and requires a high manufacturing cost. If an upper limit of 1.0 of the condition (4) is exceeded, in contrast, the second lens unit will have a short focal length, thereby making it difficult to correct aberrations.

If a lower limit of the condition (5) is exceeded, the third lens element in the second lens unit will have high curvature on the image side concave surface, a low workability when a required effective diameter is reserved and requires a high manufacturing cost. If an upper limit of 1.2 of the condition (5) is exceeded, the lens element will have high workability but such a radius of curvature is undesirable from a view point of correction of spherical aberration at the telephoto position.

For favorable correction of aberrations, obtaining a lens element having high workability and shorten a total length of the second lens unit, it is desirable to satisfy, in place of the conditions (4) and (5), the following conditions (4-1) and (5-1).

$$0.35 < |R22F|/f2 < 0.7 \quad (4\text{-}1)$$

$$0.35 < |R23F|/f2 < 0.8 \quad (5\text{-}1)$$

In order to thin a camera in a direction of depth, it is desirable from a viewpoint of a layout of a driving system to adopt the so-called rear focusing which moves not a front subunit but a rear subunit for moving a lens unit to focus the lens system according to the present invention.

When the zoom lens system according to the present invention adopts the rear focusing as described above, it is desirable to satisfy the following condition (6):

$$0.8 < f3/fT < 2.8 \quad (6)$$

wherein a reference symbol f3 represents a focal length of the third lens unit and a reference symbol fT designates a focal length of the zoom lens system as a whole at the telephoto position.

The condition (6) is required for thinning a thickness in a collapsed condition by limiting a moving distance for rear focusing, that is, a moving distance of the third lens unit.

If a lower limit of 0.8 of the condition (6) is exceeded, the moving distance of the third lens unit for focusing will be too short for convenient focusing control at the wide-angle position.

If an upper limit of 2.8 of the condition (6) is exceeded, in contrast, the moving distance of the third lens unit will be long at the telephoto position, whereby a lens unit moving mechanism will be large, thereby making it impossible to reduce a thickness in the collapsed condition or enlarging the zoom lens system in a diametrical direction.

In order to further facilitate the focusing control at the wide-angle position when the above rear focusing is adopted, it is desirable to satisfy, in place of the condition (6), the following condition (6-1):

$$1.0 < f3/fT < 2.0 \quad (6\text{-}1)$$

When the third lens unit is to be used as a focusing lens unit, the lens unit moving mechanism can be made compact by composing the third lens unit of a single lens component.

When the third lens unit is used as the focusing lens unit, aberrations are varied by focusing. Accordingly, correction of aberrations is unbalanced by moving the third lens unit for focusing in a composition wherein the third lens unit uses an aspherical surface to correct astigmatism remaining in the first lens unit and the second lens unit.

When the zoom lens system is to be focused by moving the third lens unit, it is preferable to correct astigmatism remaining in the first lens unit and the second lens unit nearly favorably in an entire zoom region. With astigmatism corrected as described above, it is preferable to compose the third lens unit of a spherical system.

In order to focus the zoom lens system according to the present invention by moving the third lens unit as described above, it is necessary to contrive a composition of the first lens unit in relation to that of the second lens unit so that offaxial aberrations are corrected nearly completely with the first lens unit and the second lens unit. It is preferable to configure the third lens unit as a spherical system.

In order to shorten a total length of the lens system, it is necessary to make a total length of the first lens unit as short as possible. The zoom lens system according to the present invention therefore uses the first lens unit which consists of a reduced number of two to four lens elements in combination of an aspherical surface which corrects aberrations in place of omitted lens elements.

Specifically, a first type first lens unit consists of, in order the object side, two or fewer negative lens elements and a positive lens element. Either of the two negative lens elements is configured as an aspherical lens element.

Furthermore, a second type first lens unit consists, in order from the object side, a positive lens element, two or fewer negative lens elements and a positive lens element. In this case, it is desirable to desirable to dispose an aspherical surface on either of the two positive lens elements whichever has weaker refractive power.

A third type first lens unit has a composition which is described below. That is, the third type first lens unit consists, in order from the object side, of a positive lens element and two negative lens elements. In this case, it is desirable to dispose an aspherical surface on either of the two negative lens elements.

In a case where the first lens unit is of the second type, it is desirable to satisfy the following condition (7):

$$0 < fw/f1p < 0.3 \quad (7)$$

wherein a reference symbol f1p represents a focal length of either of the two positive lens elements in the first lens unit whichever has the weaker refractive power.

The condition (7) defines the focal length f1P of the positive lens element which has the weaker refractive power when the first lens unit is of the second type. If an upper limit or 0.3 of the condition (7) is exceeded, the negative lens element in the first lens unit will have too strong power, thereby being apt to aggravate distortion and radius of curvature will be too short on a concave surface, thereby making it difficult to work the negative lens element. If an lower limit of 0 of the condition (7) is exceeded, in contrast, the lens element will have negative power and distortion must therefore be corrected with an aspherical surface which cannot have a function to correct astigmatism.

It is more preferable to satisfy, in place of the above mentioned condition (7), a condition (7-1) shown below. Furthermore, it is most desirable to satisfy a condition (7-2).

$$0 < fW/f1P < 0.2 \quad (7\text{-}1)$$

$$0 < fW/f1P < 0.1 \quad (7\text{-}2)$$

In the first lens unit which is any of the above described three types, the positive lens element and the negative lens element adjacent thereto may be cemented to each other.

When the positive lens element is cemented to the negative lens element, it is possible to prevent aberrations from being produced due to miscentering between these lens elements and a cemented ions component has a large marginal thickness, thereby being hardly miscentered. Accordingly, a high effect is obtained by cementing lens elements which have short focal lengths.

Furthermore, aberrations can be corrected favorably when the first lens unit is configured so as to satisfy the following condition (8):

$$0.2 < |Rn/f1| < 1 \tag{8}$$

wherein a reference symbol Rn represents a radius of curvature on a concave surface which is the shortest in the first lens unit and a reference symbol $f_1$ designates a focal length of said first lens unit.

If a lower limit of 0.2 of the condition (8) is exceeded, distortion and astigmatism will be produced remarkably and can hardly be corrected with the second lens unit over an entire region from the wide-angle position to the telephoto position. Furthermore, the radius of curvature on the concave surface will be short, thereby lowering workability. If an upper limit of 1 of the condition (8) is exceeded, in contrast, negative refractive power of the first lens unit will be insufficient, the first lens unit will have a large total length and rays will be high, thereby obliging to enlarge outside diameters of the lens elements.

In the zoom lens system according to the present invention, the third lens unit is moved away from the image surface as a magnification is changed from the wide-angle position to the telephoto position. It is desirable that the third lens unit satisfies the following condition (9):

$$0.4 < |\Delta X3|/Y < 4 \tag{9}$$

wherein a reference symbol $\Delta X3$ represents a displacement distance of the third lens unit from the image surface to change the magnification from the wide-angle position to the telephoto position when the zoom lens system is focused on an object located at an infinite distance and a reference symbol Y designates a diagonal length of an effective image pickup area of an image pickup device.

The condition (9) defines the displacement distance of the third lens unit from the image surface to change the magnification from the wide-angle position to the telephoto position relative to the diagonal length of the effective image pickup area.

If a lower limit of 0.4 of the condition (9) is exceeded, the third lens unit will have a short displacement distance, an airspace will be wide between the second lens unit, and the third lens unit at the telephoto position and a total focal length of the second lens unit and the third lens unit will be long, thereby enlarging a total length of the zoom lens system. If an upper limit of 4 or the condition (9) is exceeded, in contrast, the airspace between the second lens unit and the third lens unit will be narrow at the telephoto position, whereby a moving distance of the third lens unit will be insufficient for focusing on an object located at a near position.

It is more preferable to satisfy, in place of the above mentioned condition (9), the following condition (9-1).

$$0.8 < |\Delta X3|/Y < 3.7 \tag{9-1}$$

Furthermore, it is most desirable to satisfy the following condition (9-2):

$$1.2 < |\Delta X3|/Y < 3.4 \tag{9-2}$$

Furthermore, it is desirable for the present invention to satisfy the following condition (10):

$$0 < \Delta X3/\Delta X2 < 1.5 \tag{10}$$

wherein a reference symbol $\Delta X2$ represents a displacement distance of the second lens unit to change a magnification from the wide-angle position to the telephoto position when the zoom lens system is focused on the object located at the infinite distance.

The condition (10) defines the displacement distance of the third lens unit relative to the displacement distance of the second lens unit to change the magnification from the wide-angle position to the telephoto position when the zoom lens system is focused on the object located at the infinite distance.

In order to shorten a total length of the lens system, it is desirable that a space other than that required for disposing filters is as narrow as possible between the third lens unit and the image surface. Accordingly, the third lens unit is moved in a direction away from the image surface like the second lens unit and the condition (10) is larger than 0.

If an upper limit of 1.5 of the condition (10) is exceeded, the third lens unit will be too close to the second lens unit, whereby the displacement distance of the third lens unit is insufficient for focusing the lens system on the object located at the near position at the telephoto position. Since the second lens unit is close to the third lens unit and a total focal length of the second lens unit and the third lens unit is short, it is necessary for obtaining a high vari-focal ratio to prolong a moving distance of the first lens unit. Accordingly, it is necessary to preliminarily reserve a wide airspace between the first lens unit and the second lens unit, thereby prolonging a total length of the lens system.

It is more desirable to satisfy, in place of the condition (10), the following condition (10-1):

$$0 < \Delta X3/\Delta X2 < 1.4 \tag{10-1}$$

Furthermore, it is most desirable to satisfy the following condition (10-2):

$$0.4 < \Delta X3/\Delta X2 < 1.3 \tag{10-2}$$

An image pickup apparatus according to the present invention can be composed by disposing an electronic image pickup device at a location of an image formed by the zoom lens system having the first composition according to the present invention.

A zoom lens system which has a second composition according to the present invention is characterized in that the lens system comprises, in order from the object side, a first lens unit having negative refractive power, a second lens unit having positive refractive power and a third lens unit having positive refractive power, that a magnification is changed from a wide-angle position to a telephoto position by moving the third lens unit so as to widen a spacing between the third lens unit and an image surface and that the third lens unit consists of a single positive lens component, and satisfies the following conditions (11), (12), (13) and (14):

$$|fw/f_{2R}| < 0.1 \tag{11}$$

$$0.89 < f3/fT < 2.8 \tag{12}$$

$$1.1 < |\beta 23T| < 2 \tag{13}$$

$$1/\beta 2T < 0.25 \tag{14}$$

wherein a reference symbol f2R represents a lens element disposed on a most image side in the second lens unit, a reference symbol f3 designates a focal length of the third lens unit, a reference symbol β23T denotes a total magnification of the second lens unit and the third lens unit at the telephoto position, a reference symbol $f_W$ represents a focal length of the lens system as a whole at wide-angle position, a reference symbol $f_T$ represents a focal length of the lens system as a whole at telephoto position, and a reference symbol β2T represents a magnification of the second lens unit at the telephoto position.

For an electronic image pickup apparatus such as a digital still camera, it is necessary to allow rays to be incident on an image pickup device at extremely small angles.

The zoom lens system which has the second composition according to the present invention is configured to use as the third lens unit a most image side positive lens element of a second lens unit of a zoom lens system which consists of a first negative lens unit and a second positive lens unit, and move the third lens unit independently so as to locate an exit pupil at a farther position at a magnification change time of the lens system. Furthermore, the zoom lens system is configured to satisfy the above mentioned conditions (11), (12), (13) and (14), whereby a thickness is small in a collapsed condition and aberrations are favorable from an infinite distance to a near position.

The condition (11) limits a focal length (refractive power) of the most image side lens element of the second lens unit so that the thickness is small in the collapsed condition.

If a upper limit of 0.1 of the condition (11) is exceeded, it will be difficult to thin the lens element, thereby making it impossible to obtained a small thickness in the collapsed condition.

In order to obtain a smaller thickness, prevent chromatic aberration from being produced and suppress influences due to temperature and humidity changes, it is desirable to satisfy in place of the condition (11), the following condition (11-1):

$$|fw/f_{2R}|<0.05 \tag{11-1}$$

The condition (12) is specified for reducing a thickness in the collapsed condition by limiting a moving distance of the third lens unit.

The zoom lens system which has the second composition according to the present invention is configured to favorably correct aberrations by balancing aberrations between the second lens unit and the third lens unit. It a lower limit of 0.89 of the condition (12) is exceeded, the third lens unit will have strong refractive power, thereby making it difficult to correct coma and astigmatism produced by the third lens unit. It an upper limit of 2.8 of the condition (12) is exceeded, in contrast, the second lens unit will have strong refractive power, thereby making it difficult to correct spherical aberration.

Furthermore, it is desirable for reducing the thickness in the collapsed condition to satisfy, in place of the condition (12), the following condition (12-1):

$$1.1<f3/fT<2 \tag{12-1}$$

The condition (13) defines a total magnification β23T of the second lens unit and the third lens unit at the telephoto position when the zoom lens system is focused on the object located at the infinite distance. An absolute value of β23T which is as large as possible makes it possible to shallow a location of the exit pupil at the wide-angle position, facilitate to reduce a diameter of the first lens unit and reduce a thickness of the first lens unit. If a lower limit or 1.1 of the condition (13) is exceeded, it will be difficult to reduce the thickness of the first lens unit or if an upper limit of 2 of the condition (13) is exceeded, it will be difficult to correct spherical aberration, coma, astigmatism and the like.

It is more desirable to satisfy, in place of the condition (13), the following (13-1):

$$1.2<β23T<1.8 \tag{13-1}$$

The condition (14) is required to reduce variations of aberrations to be caused by focusing, or is a condition for reducing variations of aberrations for photographing at a magnification down to 0.05×. If an upper limit of 0.23 of the condition (14) is exceeded, it will be difficult to correct spherical aberration, coma, astigmatism and the like for photographing an object located at a near position.

For obtaining a favorable image of the object located at the near position at a magnification of 0.1×, it is desirable to satisfy, in place of the condition (14), the following condition (14-1):

$$1/β2T<0.1 \tag{14-1}$$

In order to reduce the thickness in the collapsed condition, the lens system which has the composition according to the present invention is configured to select curvature as low as possible on the second lens unit, weaken refractive power of the second lens unit accordingly and compensate for insufficient refractive power with the third lens unit. Accordingly, the third lens unit is moved in a direction identical to a moving direction of the second lens unit to change a magnification. It is desirable that moving distances of the second lens unit and the third lens unit from the wide-angle position to the telephoto position satisfy the following condition (15):

$$0.33<ΔX3/ΔX2<1.67 \tag{15}$$

wherein reference symbols ΔX2 and ΔX3 represent moving distances of the second lens unit and the lens unit respectively from the wide-angle position to the telephoto position.

If an upper limit of 1.67 of the condition (15) is exceeded, the second lens unit will have weak refractive power, thereby making it difficult to correct aberrations. Furthermore, the zoom lens system will have a large total length at a photographing time and requires a long time to shift from the collapsed condition to a photographing condition, thereby posing a problem of shutter chance missing or the like. If a lower limit of 0.33 of the condition (15) is exceeded, the zoom lens system will have a large thickness in the collapsed condition.

In case of a camera using electronic image pickup devices which is a camera for photographing with three CCDs disposed after a color separation prism, an interference film is used as the interference prism and color shading is produced when a light bundle from an optical system is inclined. In order to avoid the color shading, it is necessary to limit an inclination or a principal ray relative to an optical axis within five degrees.

For this reason, it is desirable that the zoom lens system having the above described composition according to the present invention satisfies the following condition (16):

$$DW/fW > 5 \tag{16}$$

wherein a reference symbol DW represents a distance as measured from an aperture stop to an image surface at the wide-angle position.

If a lower limit of 5 of the condition (16) is exceeded, an inclination angle of the principal ray exceeds five degrees, thereby producing color shading.

When an optical system is equipped with a single-lens reflex type view finder, a half mirror and a quick return mirror must be disposed between a lens element and an image surface, thereby making it necessary to reserve a spacing between the lens element and the image surface. For this reason, the optical system must satisfy the following condition (17).

$$f2/fW > 3.6 \tag{17}$$

wherein a reference symbol f2 represents a focal length of a second lens unit.

If a lower limit of 3.6 of the condition (17) is exceeded, it will be impossible to dispose a light splitting member for the single-lens reflex view finder or it will be necessary to increase a number of lens elements of the second lens unit, whereby the second lens unit is thickened, a total length of the lens system is enlarged and a thickness in a collapsed condition cannot be reduced. When the quick return mirror is disposed, the total length of the lens system is enlarged but the thickness in the collapsed condition can be reduced since the quick return mirror leaps up in the collapsed condition.

For focusing the zoom lens system which has the second composition according to the present invention, it is desirable to move the third lens unit. By moving the third lens unit on the object side, the zoom lens system can be focused on an object locate at a near position.

When the third lens unit is moved for focusing, a problem is posed by variations of aberrations to be caused by moving the lens unit. When an aspherical surface is disposed on the third lens unit to correct aberrations remaining in the first lens unit and the second lens unit, correction is unbalanced by moving the lens unit for focusing. When the third lens unit is to be moved for focusing, it is desirable to correct astigmatism favorably over an entire vari-focal range with the first lens unit and the second lens unit, and the third lens unit is configured as a spherical system. It is effective to satisfy the condition (12) even when the third lens unit is to be moved for focusing. When the condition (12) is satisfied, a moving distance of the third lens unit is limited and a thickness in the collapsed condition can be reduced.

If a lower limit of the condition (12) is exceeded, the third lens unit will have a long moving distance for focusing at the telephoto position and a mechanism for supporting the third lens unit will be large, thereby making it difficult to reduce a thickness in the collapsed condition. Furthermore, the third lens unit will be prolong in a diametrical direction. When the condition (12-1) is satisfied in place of the condition (12), it is easier to limit a moving distance of the third lens unit for focusing at the wide-angle position and a thickness can further be reduced in the collapsed condition.

In order to reduce a thickness of the zoom lens system having the second composition according to the present invention as small as possible, it is necessary to reduce a thickness of the second lens unit as small as possible. For this purpose, it is necessary to reduce a number of lens elements or lower curvature. However, curvature at a certain degree is necessary since refractive power at a certain degree is necessary for correction of aberrations. It is therefore desirable that the second lens unit satisfies the following condition (18):

$$0.3 < |R2b|/f2 < 0.6 \tag{18}$$

wherein a reference symbol R2b represents a minimum radius of curvature on a convex surface which is in contact with air in the second lens unit (radius of curvature in the vicinity of the optical axis in case of an aspherical surface) and a reference symbol f2 designates a focal length of the second lens unit.

If a lower limit of 0.3 of the condition (18) is exceeded, the second lens unit will have too large a thickness, thereby making a thickness in the collapsed condition too large. If an upper limit of 0.6 of the condition (18) is exceeded, it will be difficult to correct aberrations, spherical aberration in particular.

For the zoom lens system which has the second composition according to the present invention, it is preferable to dispose an aperture stop on the object side of the second lens unit and dispose an aspherical surface on a most image side lens element in the second lens unit which is effective for correction of offaxial aberrations. Coma can be corrected favorably by disposing an aspherical surface on the most image side lens element in the second lens unit.

Generally speaking, an aspherical surface is disposed mostly on a surface of a lens element which is made of a glass material having a small Abbe's number.

The lens element on which the aspherical surface is disposed can not only have a small thickness when the lens element satisfies the above mentioned condition (12) but also prevent chromatic aberration from being produced even when it is made of a glass material having a small Abbe's number. Furthermore, this lens element is hardly influenced due to temperature and humidity changes.

Furthermore, since aberrations are remarkably varied due to miscentering between a positive lens element and a negative lens element which are disposed on the object side in the second lens unit, it is preferable to cement these lens elements to each other. Furthermore, since a front lens element can hardly have a large diameter in a lens system of a type wherein a first lens unit is negative and a second lens unit is positive, it is preferable to integrate an aperture stop with the second lens unit, or dispose an aperture stop on the object side of the second lens unit so that the aperture stop is moved together with the second lens unit for a magnification change, thereby simplifying a moving mechanism and allowing a dead space hardly to be formed in a collapsed condition. Furthermore, F numbers at the wide-angle position and the telephoto position can be reduced by cementing the aperture stop to the second lens unit.

Taking the above described merits into consideration, it is preferable for the second lens unit to have a composition of a single lens element and a cemented lens component and a single lens element or a cemented lens component and a single lens element.

Furthermore, it is more preferable that the second lens unit consists of a single lens element, a cemented lens component and a single lens element, and satisfies the following condition (21):

$$|fw/f_{2F}| < 0.1 \tag{21}$$

wherein a reference symbol $f_{2F}$ represents a focal length of the most object side single lens element.

In the composition described above, the single lens elements has weak refractive power and surfaces which are nearly planar, the lens element has a low aberration correcting capability. It is necessary to compensate this insufficient aberration correcting capability with an aspherical surface.

In case of the composition of a cemented lens component and a single lens element out of the above described compositions, an aspherical used as a most image side surface makes it possible to obtain imaging performance equivalent to that of a composition of a single lens element, a cemented lens component and a single lens element even when the object side single lens element is omitted in the composition of the single lens element, the cemented lens component and the single lens element. In this case, the cemented lens component has a meniscus shape having a convex surface on the object side in either composition. Furthermore, it is possible to obtain a lens element which has a function equivalent to that of the cemented lens component by separating a cemented surface of a cemented lens component so as to dispose two lens elements with a slight airspace interposed and configuring surf aces of the lens elements opposed to each other so as to have nearly equal curvature.

For the zoom lens system which has the second composition according to the present invention, it is desirable to compose the first lens unit of a small number of lens elements so that the first lens unit is as thin as possible and compensate an aberration correcting function lowered by reducing a number of lens element with an aspherical surface.

It if therefore preferable to compose the first lens unit two or three lens elements. When the first lens unit is to be composed of three lens elements, it is desirable, for example, that the first lens unit consists, in order from the object side, of a single lens element having an aspherical surface, a single lens element having negative refractive power and a positive meniscus lens component having a convex surface on the object side, and that the most object side lens element (the single lens element having the aspherical surface) satisfies the following condition (22):

$$|f_1/f_{11}|<0.2 \quad (22)$$

wherein a reference symbol $f_{11}$ represents a focal length of the most object side lens element in the first lens unit.

Furthermore, it is preferable that the first lens unit consists, in order from the object side, of a single biconvex lens element, a single lens element which has a strongly concave surface on the image side and negative refractive power, and a lens element having an aspherical surface, and satisfies the following condition (23):

$$|f_1/f_{13}|<0.2 \quad (23)$$

wherein a reference symbol $f_{13}$ represents a focal length of the most image side aspherical lens element which is a third lens element in the first lens unit.

Furthermore, it is desirable that the first lens unit consists of a single lens element having an aspherical surface, a single lens element which has a strongly concave surface on the image side and negative refractive power, and a lens element having an aspherical surface, and that the most object side lens element and the most image aide lens element which is a third lens element satisfy the condition (22) and the condition (23) respectively. When the first lens unit is to be composed of two lens elements, it is desirable to compose the first lens unit of a negative lens element and a positive lens element, and dispose an aspherical surface on the negative lens element.

When a focal length of i'th lens element as counted from the object side in the first lens unit is represented by $f_{11}$, and a focal length of the first lens unit is designated by $f_1$, a lens element which satisfies a condition (20) $|f_1/f_{11}|<0.2$ will hereinafter no referred to as a lens element having weak refractive power.

When the first lens unit has the composition, in order from the object side, of the lens element having the weak refractive power, the negative lens element and the positive lens elements out of the compositions described above, the first lens unit can be thinned by weakening refractive power of a most object side lens element and an aberration correcting function which is made insufficient by weakening the refractive power can be compensated with an aspherical surface. Furthermore, it is possible to favorably correct coma and astigmatism by configuring an image side surface of the negative lens element used as the second lens element in this composition as a strongly concave surface and configuring the positive lens element used as the third lens element as a meniscus lens element which is convex on the object side.

When the first lens unit is composed, in order from the object side, of the lens element having the weak refractive power, the negative lens element and the lens element having the weak refractive power, it is desirable to extremely weaken the refractive power of the most image side lens element having the weak refractive power so that the lens element has a shape close to that of a plane parallel plate and correct aberrations produced by weakening the refractive power by disposing an aspherical surface.

Furthermore, description will be made of a case where the first lens unit is to be composed, in order from the object side, of the positive lens clement, the lens element having the weak refractive power and the lens element having the weak refractive power. When the first lens unit is to be composed of three spherical lens element, it is general to compose the first lens unit of a first positive biconvex lens element, a second negative lens element having a concave surface on the image side and a third positive meniscus lens element having a convex surface on the object side. However, the fist lens unit is prettily thick in a direction of the optical axis since the third lens element is the meniscus lens element. In order to thins the first lens unit, it is therefore preferable to weaken refractive power of the most image side lens element so that the lens element has a shape which is close to that of a plane parallel plate and thin in a direction of the optical axis, and use an aspherical surface for correcting aberrations produced by weakening the refractive power.

When the first lens unit is to be composed of two lens elements, it is preferable to compose the lens unit of a negative lens element and a positive lens element, and configure an object side surface of the negative lens element as an aspherical surfaces.

In this case, it is sufficient to omit a most object side aspherical lens element having weak refractive power from a first lens unit which is composed of three lens elements, in order from the object side, a lens element which has an aspherical surface and weak refractive power, a negative lens element and a positive lens element so that the first lens unit is composed of two lens elements of the negative and positive lens elements, and correct aberrations produced by omitting the aspherical lens element by configuring an object side surface of the negative lens element as an aspherical surface.

Accordingly, the first lens unit can be composed of only two lens elements and thin, and have a small thickness in a collapsed condition.

The above described aspherical lens elements having the weak refractive power in the first lens unit and the second lens unit can be made of a material having refractive power which is changed by temperature and humidity changes. When a plastic material is used, for example, mass production of the aspherical lens element is possible to lower a manufacturing cost of the aspherical lens element. When a camera has an automatic focusing function, a deviation of a perfocal point caused by temperature and humidity changes can be automatically corrected to reduce variations of aberrations.

Furthermore, variations of aberrations due to perfocality deviation caused by the temperature and humidity changes can be reduced to levels which are not problematic for practical use when the first lens unit is configured so as to satisfy the following condition (19):

$$|fw/fp| < 0.1 \quad (19)$$

wherein a reference symbol fP represents a focal length of the plastic lens element and a reference symbol fW designates a focal length of the zoom lens system as a whole at the wide-angle position.

Furthermore, it is more desirable to satisfy the following condition (19-1):

$$|fw/fp| < 0.05 \quad (19\text{-}1)$$

Furthermore, it is most desirable to satisfy the following condition (19-2):

$$|fw/fp| < 0.02 \quad (19\text{-}2)$$

The image pickup apparatus according to the present invention can be composed by disposing an image pickup device at a location of an image formed by the zoom lens system having the second composition according to the present invention described above.

Now, embodiments of the zoom lens system according to the present invention will be described below. First through twelfth embodiments of the present invention have compositions shown in FIGS. 1 through 12 and numerical data which is listed below:

| Embodiment 1 | | | |
|---|---|---|---|
| $f = 4.39 \sim 7.36 \sim 13.28$, F No. $= 2.6 \sim 3.0 \sim 3.8$ | | | |
| $2\omega = 61.6° \sim 38.4° \sim 21.5°$ | | | |
| $r_1 = 22.3939$ | | | |
| $d_1 = 1.8000$ | $n_1 = 1.80518$ | $v_1 = 25.42$ | |
| $r_2 = 348.5738$ | | | |
| $d_2 = 0.1000$ | | | |
| $r_3 = 15.7649$ | | | |
| $d_3 = 1.0000$ | $n_2 = 1.80610$ | $v_2 = 40.92$ | |
| $r_4 = 4.0548$ | | | |
| $d_4 = 2.8000$ | | | |
| $r_5 = -11.4208$ | | | |
| $d_5 = 0.8000$ | $n_3 = 1.58913$ | $v_3 = 61.14$ | |
| $r_6 = 21.0401$ | | | |
| $d_6 = 0.1309$ | | | |
| $r_7 = 8.5617$ | | | |
| $d_7 = 1.8749$ | $n_4 = 1.80518$ | $v_4 = 25.42$ | |
| $r_8 = 19.8370$ | | | |
| $d_8 = D_1$ (variable) | | | |
| $r_9 = \infty$ (stop) | | | |
| $d_9 = 1.0000$ | | | |
| $r_{10} = 9.2527$ | | | |
| $d_{10} = 1.9000$ | $n_5 = 1.58913$ | $v_5 = 61.14$ | |

| -continued | | | |
|---|---|---|---|
| Embodiment 1 | | | |
| $r_{11} = -20.2043$ | | | |
| $d_{11} = 0.1000$ | | | |
| $r_{12} = 6.8812$ | | | |
| $d_{12} = 3.1000$ | $n_6 = 1.51633$ | $v_6 = 64.14$ | |
| $r_{13} = -8.7661$ | | | |
| $d_{13} = 1.0000$ | $n_7 = 1.80100$ | $v_7 = 34.97$ | |
| $r_{14} = 7.3857$ | | | |
| $d_{14} = 0.9000$ | | | |
| $r_{15} = 132.9473$ | | | |
| $d_{15} = 1.6000$ | $n_8 = 1.58913$ | $v_8 = 61.14$ | |
| $r_{16} = -62.6369$ (aspherical) | | | |
| $d_{16} = D_2$ (variable) | | | |
| $r_{17} = 12.4195$ | | | |
| $d_{17} = 2.0000$ | $n_9 = 1.48749$ | $v_9 = 70.23$ | |
| $r_{18} = -20.1996$ | | | |
| $d_{18} = D_3$ (variable) | | | |
| $r_{19} = \infty$ | | | |
| $d_{19} = 1.9000$ | $n_{10} = 1.54771$ | $v_{10} = 62.84$ | |
| $r_{20} = \infty$ | | | |
| $d_{20} = 0.8000$ | | | |
| $r_{21} = \infty$ | | | |
| $d_{21} = 0.7500$ | $n_{11} = 1.51633$ | $v_{11} = 64.14$ | |
| $r_{22} = \infty$ | | | |
| $d_{22} = 1.1500$ | | | |
| $r_{23} = \infty$ (image) | | | | aspherical surface coefficients
(16th surface) $K=0$, $A_2=0$, $A_4=7.6443\times10^{-4}$, $A_6=3.1520\times10^{-5}$, $A_8=-6.3998\times10^{-7}$ When focused on object at infinite distance

| f | 4.39 | 7.36 | 13.28 |
|---|---|---|---|
| $D_1$ | 14.86375 | 6.83898 | 1.40000 |
| $D_2$ | 3.86743 | 4.28784 | 3.41189 |
| $D_3$ | 1.50000 | 5.77836 | 14.68381 |

When focused on an object at a distance of 100 mm

| f | 4.39 | 7.36 | 13.28 |
|---|---|---|---|
| $D_1$ | 14.86375 | 6.83898 | 1.40000 |
| $D_2$ | 3.58234 | 3.71649 | 1.50000 |
| $D_3$ | 1.78509 | 6.34970 | 16.59570 | fW=4.39, fS=7.36, fT=13.28, f1=−7.700, f2=11.129, f3=16.100, |β23T|=1.726, f2/f3=0.701, f3/fT=1.212, |R22F|/f2=0.609 |R23R|/f2=0.654, |Rn/f1|=0.527, fw/f1P=0.148, |fw/f$_{2R}$|=0.061, |ΔX3|/Y=2.637, ΔX3/ΔX2=1.036, 1/β2T=0.112, Dw/fw=(4.91), f2/fw=(2.54), |R2b|/f2=(0.62), |fw/f$_{2F}$|=(0.398)

| Embodiment 2 | | | |
|---|---|---|---|
| $f = 4.39 \sim 7.36 \sim 13.28$, F No. $= 2.8 \sim 3.1 \sim 4.1$ | | | |
| $2\omega = 61.7° \sim 38.1° \sim 21.5°$ | | | |
| $r_1 = 39.0476$ | | | |
| $d_1 = 2.6000$ | $n_1 = 1.80518$ | $v_1 = 25.42$ | |
| $r_2 = -19.4310$ | | | |
| $d_2 = 1.0000$ | $n_2 = 1.51823$ | $v_2 = 58.90$ | |
| $r_3 = 3.3950$ | | | |
| $d_3 = 3.7624$ | | | |
| $r_4 = -33.9405$ (aspherical surface) | | | |
| $d_4 = 1.8749$ | $n_3 = 1.80610$ | $v_3 = 40.92$ | |
| $r_5 = -88.4233$ | | | |
| $d_5 = D_1$ (variable) | | | |

-continued

Embodiment 2

$r_6 = \infty$ (stop)
$d_6 = 1.0000$
$r_7 = 9.7867$
$d_7 = 1.9000$ $n_4 = 1.58913$ $\nu_4 = 61.14$
$r_8 = -24.5487$
$d_8 = 0.1000$
$r_9 = 6.6104$
$d_9 = 3.1000$ $n_5 = 1.51633$ $\nu_5 = 64.14$
$r_{10} = -13.6455$
$d_{10} = 1.0000$ $n_6 = 1.80100$ $\nu_6 = 34.97$
$r_{11} = 8.6857$
$d_{11} = 0.9000$
$r_{12} = -87.4306$
$d_{12} = 1.6000$ $n_7 = 1.58913$ $\nu_7 = 61.14$
$r_{13} = 55.1334$ (aspherical surface)
$d_{13} = D_2$ (variable)
$r_{14} = 12.8217$
$d_{14} = 2.0000$ $n_8 = 1.48749$ $\nu_8 = 70.23$
$r_{15} = -19.0137$
$d_{15} = D_3$ (variable)
$r_{16} = \infty$
$d_{16} = 1.9000$ $n_9 = 1.54771$ $\nu_9 = 62.84$
$r_{17} = \infty$
$d_{17} = 0.8000$
$r_{18} = \infty$
$d_{18} = 0.7500$ $n_{10} = 1.51633$ $\nu_{10} = 64.14$
$r_{19} = \infty$
$d_{19} = 1.1500$
$r_{20} = \infty$ (image)

aspherical surface coefficients (4th surfce) $K=0$, $A_2=0$, $A_4=1.0487\times10^{-3}$, $A_6=-5.3327\times10^{-5}$, $A_8=7.6639\times10^{-6}$ (13th surface) $K=0$, $A_2=0$, $A_4=1.3444\times10^{-3}$, $A_6=8.8157\times10^{-6}$, $A_8=1.2513\times10^{-6}$ When focused on object at infinite distance

| f | 4.39 | 7.36 | 13.28 |
|---|---|---|---|
| $D_1$ | 15.85385 | 6.54122 | 1.40000 |
| $D_2$ | 4.32351 | 1.85062 | 3.96678 |
| $D_3$ | 1.50000 | 6.89493 | 15.29796 |

When focused on an object at a distance of 100 mm

| f | 4.39 | 7.36 | 13.28 |
|---|---|---|---|
| $D_1$ | 15.85385 | 6.54122 | 1.40000 |
| $D_2$ | 4.03823 | 1.30000 | 2.00000 |
| $D_3$ | 1.78528 | 7.44555 | 17.26474 | fW=4.39, fS=7.36, fT=13.28, f1=−7.800, f2=11.560, f3=16.039, |β23T|=1.703, f2/f3=0.721, f3/fT=1.208, |R22F|/f2=0.572, |R23R|/f2=0.751, |Rn/f1|=0.435, |fw/f$_{2R}$|=0.077, |ΔX3|/Y=2.760, ΔX3/ΔX2=1.027, 1/β2T=0.137, Dw/fw= 5.02, f2/fw=(2.63), |R2b|/f2−0.57, |f$_1$/f$_{13}$|=0.112, |fw/f$_{2F}$|= (0.362)

Embodiment 3 f = 4.39~7.36~13.28, F No. = 2.7~3.1~4.1
2 ω = 61.5°~38.2°~21.5°
$r_1 = 31.2493$
$d_1 = 1.9500$ $n_1 = 1.84666$ $\nu_1 = 23.78$
$r_2 = -65.0991$
$d_2 = 0.6808$

-continued

Embodiment 3

$r_3 = -444.0763$
$d_3 = 1.0000$ $n_2 = 1.77250$ $\nu_2 = 49.60$
$r_4 = 3.9935$
$d_4 = 3.8998$
$r_5 = -137.8476$ (aspherical surface)
$d_5 = 1.8521$ $n_3 = 1.80610$ $\nu_3 = 40.92$
$r_6 = -51.1701$
$d_6 = D_1$ (variable)
$r_7 = \infty$ (stop)
$d_7 = 1.0000$
$r_8 = 7.7924$
$d_8 = 2.2000$ $n_4 = 1.58913$ $\nu_4 = 61.14$
$r_9 = -22.1410$
$d_9 = 0.1000$
$r_{10} = 7.3555$
$d_{10} = 2.9000$ $n_5 = 1.51633$ $\nu_5 = 64.14$
$r_{11} = -7.3364$
$d_{11} = 1.0000$ $n_6 = 1.83400$ $\nu_6 = 37.16$
$r_{12} = 7.7514$
$d_{12} = 0.9000$
$r_{13} = \infty$
$d_{13} = 1.2000$ $n_7 = 1.58913$ $\nu_7 = 61.14$
$r_{14} = -589.1299$ (aspherical surface)
$d_{14} = D_2$ (variable)
$r_{15} = 15.6009$
$d_{15} = 2.0000$ $n_8 = 1.48749$ $\nu_8 = 70.23$
$r_{16} = -17.1493$
$d_{16} = D_3$ (variable)
$r_{17} = \infty$
$d_{17} = 1.90000$ $n_9 = 1.54771$ $\nu_9 = 62.84$
$r_{18} = \infty$
$d_{18} = 0.8000$
$r_{19} = \infty$
$d_{19} = 0.7500$ $n_{10} = 1.51633$ $\nu_{10} = 64.14$
$r_{20} = \infty$
$d_{20} = 1.1500$
$r_{21} = \infty$ (image)

aspherical surface coefficients (5th surface) $K=0$, $A_2=0$, $A_4=6.1115\times10^{-4}$, $A_6=6.3032\times10^{-7}$, $A_8=1.3229\times10^{-6}$ (14th surface) $K=0$, $A_2=0$, $A_4=9.8979\times10^{-4}$, $A_6=1.9313\times10^{-5}$, $A_8=4.2402\times10^{-7}$ When focused on object at infinite distance

| f | 4.39 | 7.36 | 13.28 |
|---|---|---|---|
| $D_1$ | 17.09115 | 7.30302 | 1.40000 |
| $D_2$ | 4.72311 | 3.80530 | 3.35776 |
| $D_3$ | 1.50000 | 6.53742 | 15.30673 |

When focused on an object at a distance of 100 mm

| f | 4.39 | 7.36 | 13.28 |
|---|---|---|---|
| $D_1$ | 17.09115 | 7.30302 | 1.40000 |
| $D_2$ | 4.41989 | 3.23129 | 1.50000 |
| $D_3$ | 1.80322 | 7.11143 | 17.16449 | fW=4.39, fS=7.36, fT=13.28, f1=−8.100, f2=12.050, f3=17.100, |β23T|=1.641, f2/f3=0.702, f3/fT=1.288, |R22F|/f2=0.613, |R23R|/f2=0.646, fw/f1P=0.044, |Rn/f1|=0.493, |fw/f$_{2R}$|=0.004, |ΔX3|/Y=2.761, ΔX3/ΔX2=1.110, 1/β2T= 0.093, Dw/fw=5.04, f2/fw=(2.74), |R2b|/f2=(0.61), |f$_1$/f$_{13}$|= 0.081, |fw/f$_{2F}$|=(0.436)

Embodiment 4 f = 4.39~7.36~13.28, F No. = 2.7~3.0~3.9
2 ω = 61.6°~38.1°~21.5°

$r_1$ = 21.8880
    $d_1$ = 2.0000    $n_1$ = 1.80518    $v_1$ = 25.42
$r_2$ = −232.1113
    $d_2$ = 0.1000
$r_3$ = 66.0797
    $d_3$ = 1.0000    $n_2$ = 1.72916    $v_2$ = 54.68
$r_4$ = 3.8960
    $d_4$ = 2.9328
$r_5$ = 102.4655
    $d_5$ = 1.5000    $n_3$ = 1.69350    $v_3$ = 53.21
$r_6$ = 101.1790 (aspherical surface)
    $d_6$ = $D_1$ (variable)
$r_7$ = ∞ (stop)
    $d_7$ = 1.0000
$r_8$ = 10.5283
    $d_8$ = 2.0000    $n_4$ = 1.58913    $v_4$ = 61.14
$r_9$ = −21.7004
    $d_9$ = 0.1000
$r_{10}$ = 6.4212
    $d_{10}$ = 2.5630    $n_5$ = 1.58913    $v_5$ = 61.14
$r_{11}$ = 9.0162
    $d_{11}$ = 1.4081
$r_{12}$ = −21.3483
    $d_{12}$ = 1.0000    $n_6$ = 1.80518    $v_6$ = 25.42
$r_{13}$ = 8.9634
    $d_{13}$ = 0.6094
$r_{14}$ = 22.4710 (aspherical surface)
    $d_{14}$ = 1.6000    $n_7$ = 1.80610    $v_7$ = 40.92
$r_{15}$ = −55.2464
    $d_{15}$ = $D_2$ (variable)
$r_{16}$ = 13.0983
    $d_{16}$ = 2.0000    $n_8$ = 1.48749    $v_8$ = 70.23
$r_{17}$ = −21.7808
    $d_{17}$ = $D_3$ (variable)
$r_{18}$ = ∞
    $d_{18}$ = 1.9000    $n_9$ = 1.54771    $v_9$ = 62.84
$r_{19}$ = ∞
    $d_{19}$ = 0.8000
$r_{20}$ = ∞
    $d_{20}$ = 0.7500    $n_{10}$ = 1.51633    $v_{10}$ = 64.14
$r_{21}$ = ∞
    $d_{21}$ = 1.1500
$r_{22}$ = ∞ (image)

aspherical surface coefficients
(6th surfce) K=0, $A_2$=0, $A_4$=−9.4576×10$^{-4}$, $A_6$=2.8900×10$^{-5}$, $A_8$=−3.6170×10$^{-6}$
(14th surface) K=0, $A_2$=0, $A_4$=−8.5497×10$^{-4}$, $A_6$=6.5751×10$^{-6}$, $A_8$=−1.9103×10$^{-6}$ When focused on object at infinite distance

| f | 4.39 | 7.36 | 13.28 |
|---|---|---|---|
| $D_1$ | 17.04112 | 7.81817 | 2.08524 |
| $D_2$ | 3.66129 | 2.98472 | 3.33348 |
| $D_3$ | 1.50000 | 6.20412 | 14.75940 |

When focused on an object at a distance of 100 mm

| f | 4.39 | 7.36 | 13.28 |
|---|---|---|---|
| $D_1$ | 17.04112 | 7.81817 | 2.08524 |
| $D_2$ | 3.36262 | 2.40452 | 1.50000 |
| $D_3$ | 1.79867 | 6.78432 | 16.59288 | fW=4.39, fS=7.36, fT=13.28, f1=−8.101, f2=11.750, f3=17.100, |β23T|=1.640, f2/f3=0.687, f3/fT=1.288, |R22F|/f2=0.546, |R23R|/f2=0.763, |Rn/f1|=0.481, |fw/f$_{2R}$|=0.219, |ΔX3|/Y=2.652, ΔX3/ΔX2=1.025, 1/β2T=0.078, Dw/fw=5.02, f2/fw=(2.68), |R2b|/f2=0.55, |fw/f$_{2F}$|=(0.356)

Embodiment 5 f = 4.41~8.82~13.34, F No. = 2.8~3.5~4.4
2ω = 61.4°~32.0°~21.4°

$r_1$ = 11.2304
    $d_1$ = 2.2545    $n_1$ = 1.77250    $v_1$ = 49.60
$r_2$ = 4.2365
    $d_2$ = 3.6607
$r_3$ = 40.7014 (aspherical surface)
    $d_3$ = 0.6681    $n_2$ = 1.58313    $v_2$ = 59.38
$r_4$ = 6.2588
    $d_4$ = 1.8543
$r_5$ = 9.1628
    $d_5$ = 1.2803    $n_3$ = 1.84666    $v_3$ = 23.78
$r_6$ = 15.0798
    $d_6$ = $D_1$ (variable)
$r_7$ = ∞ (stop)
    $d_7$ = 0
$r_8$ = 38.1499
    $d_8$ = 0.8998    $n_4$ = 1.65160    $v_4$ = 58.55
$r_9$ = −13.1152
    $d_9$ = 0.4846
$r_{10}$ = 6.2796
    $d_{10}$ = 1.5325    $n_5$ = 1.74100    $v_5$ = 52.64
$r_{11}$ = 26.1871
    $d_{11}$ = 0.8772
$r_{12}$ = −25.9894
    $d_{12}$ = 3.0191    $n_6$ = 1.78470    $v_6$ = 26.29
$r_{13}$ = 5.2190
    $d_{13}$ = 1.3095
$r_{14}$ = −13.0487
    $d_{14}$ = 1.2076    $n_7$ = 1.69350    $v_7$ = 53.21
$r_{15}$ = −6.7316 (aspherical surface)
    $d_{15}$ = $D_2$ (variable)
$r_{16}$ = 8.5500
    $d_{16}$ = 1.2992    $n_8$ = 1.51633    $v_8$ = 64.14
$r_{17}$ = 22.6042
    $d_{17}$ = $D_3$ (variable)
$r_{18}$ = ∞
    $d_{18}$ = 0.8000    $n_9$ = 1.51633    $v_9$ = 64.14
$r_{19}$ = ∞
    $d_{19}$ = 1.3600    $n_{10}$ = 1.54771    $v_{10}$ = 62.84
$r_{20}$ = ∞
    $d_{20}$ = 0.8000
$r_{21}$ = ∞
    $d_{21}$ = 0.7500    $n_{11}$ = 1.51633    $v_{11}$ = 64.14
$r_{22}$ = ∞
    $d_{22}$ = 1.2000
$r_{23}$ = ∞ (image)

aspherical surface coefficients
(3rd surface) K=0, $A_2$=0, $A_4$=1.0697×10$^{-3}$, $A_6$=5.2702×10$^{-6}$, $A_8$=2.0826×10$^{-5}$
(15th surface) K=0, $A_2$=0, $A_4$=−3.9381×10$^{-6}$, $A_6$=1.4383×10$^{-6}$, $A_8$=−1.8644×10$^{-6}$ When focused on object at infinite distance

| f | 4.41 | 8.82 | 13.24 |
|---|---|---|---|
| $D_1$ | 16.33165 | 5.27225 | 2.40113 |
| $D_2$ | 6.24388 | 1.44528 | 2.65700 |
| $D_3$ | 0.43365 | 10.54547 | 17.28400 |

When focused on an object at a distance of 100 mm

| f | 4.41 | 8.82 | 13.34 |
|---|---|---|---|
| $D_1$ | 16.33165 | 5.27225 | 2.40113 |
| $D_2$ | 5.80250 | 0.58950 | 0.90003 |
| $D_3$ | 0.87502 | 11.40125 | 19.04098 | fW=4.41, fS=8.82, fT=13.34, fT=−7.049, f2=11.806, f3=25.820, |β23T|=1.895, f2/f3=0.457, f3/fT=1.936, |R22F|/f2=0.532, |R23R|/f2=0.442, |Rn/f1|=0.601, |fw/f_{2R}|=0.237, |ΔX3|/Y=3.371, ΔX3/ΔX2=1.270, 1/β2T=0.068, Dw/fw=5.04, f2/fw=(2.68), |R2b|/f2=0.44, |fw/f_{2F}|=(0.292)

| Embodiment 6 | | | |
|---|---|---|---|
| f = 4.41~8.79~13.24, F No. = 2.8~3.7~4.9 | | | |
| 2ω = 61.4°~31.1°~21.5° | | | |
| $r_1$ = 14.7934 | | | |
| | $d_1$ = 2.0960 | $n_1$ = 1.77250 | $v_1$ = 49.60 |
| $r_2$ = 4.5435 | | | |
| | $d_2$ = 2.7386 | | |
| $r_3$ = 13.0787 (aspherical surface) | | | |
| | $d_3$ = 0.8405 | $n_2$ = 1.58313 | $v_2$ = 59.38 |
| $r_4$ = 6.3354 | | | |
| | $d_4$ = 1.1498 | | |
| $r_5$ = 7.3765 | | | |
| | $d_5$ = 1.2782 | $n_3$ = 1.76182 | $v_3$ = 26.52 |
| $r_6$ = 11.2940 | | | |
| | $d_6$ = $D_1$ (variable) | | |
| $r_7$ = ∞ (stop) | | | |
| | $d_7$ = 0 | | |
| $r_8$ = 25.9146 | | | |
| | $d_8$ = 1.1797 | $n_4$ = 1.69350 | $v_4$ = 53.21 |
| $r_9$ = 756.1108 | | | |
| | $d_9$ = 0.4844 | | |
| $r_{10}$ = 4.5059 (aspherical surface) | | | |
| | $d_{10}$ = 1.7120 | $n_5$ = 1.74100 | $v_5$ = 52.64 |
| $r_{11}$ = 22.9535 | | | |
| | $d_{11}$ = 0.5539 | | |
| $r_{12}$ = 46.0232 | | | |
| | $d_{12}$ = 1.4469 | $n_6$ = 1.80518 | $v_6$ = 25.42 |
| $r_{13}$ = 4.4336 | | | |
| | $d_{13}$ = 0.5653 | | |
| $r_{14}$ = 10.6033 | | | |
| | $d_{14}$ = 0.9423 | $n_7$ = 1.69350 | $v_7$ = 53.21 |
| $r_{15}$ = 236.8100 (aspherical surface) | | | |
| | $d_{15}$ = $D_2$ (variable) | | |
| $r_{16}$ = 7.1938 | | | |
| | $d_{16}$ = 1.1173 | $n_8$ = 1.51633 | $v_8$ = 64.14 |
| $r_{17}$ = 14.3445 | | | |
| | $d_{17}$ = $D_3$ (variable) | | |
| $r_{18}$ = ∞ | | | |
| | $d_{18}$ = 0.8000 | $n_9$ = 1.51633 | $v_9$ = 64.14 |
| $r_{19}$ = ∞ | | | |
| | $d_{19}$ = 1.3600 | $n_{10}$ = 1.54771 | $v_{10}$ = 62.84 |
| $r_{20}$ = ∞ | | | |
| | $d_{20}$ = 0.8000 | | |
| $r_{21}$ = ∞ | | | |
| | $d_{21}$ = 0.7500 | $n_{11}$ = 1.51633 | $v_{11}$ = 64.14 |
| $r_{22}$ = ∞ | | | |
| | $d_{22}$ = 1.2000 | | |
| $r_{23}$ = ∞ (image) | | | | aspherical surface coefficients (3rd surface) K=0, $A_2$=0, $A_4$=7.3055×10$^{-4}$, $A_6$=1.4909×10$^{-5}$, $A_8$=1.3224×10$^{-6}$ (10th surface) K=0, $A_2$=0, $A_4$=−2.2984×10$^{-4}$, $A_6$=−2.1835×10$^{-3}$, $A_6$=7.9507×10$^{-7}$ (15th surface) K=0, $A_2$=0, $A_4$=1.8510×10$^{-3}$, $A_6$=−9.5323×10$^{-6}$, $A_8$=4.1304×10$^5$ When focused on object at infinite distance

| f | 4.41 | 8.79 | 13.24 |
|---|---|---|---|
| $D_1$ | 13.30207 | 3.83944 | 1.09960 |
| $D_2$ | 4.11833 | 1.56989 | 2.20463 |
| $D_3$ | 0.56074 | 6.68680 | 10.92554 |

When focused on an object at a distance of 100 mm

| f | 4.41 | 8.79 | 13.24 |
|---|---|---|---|
| $D_1$ | 13.30207 | 3.83944 | 1.09960 |
| $D_2$ | 3.67469 | 0.54024 | 0.21287 |
| $D_3$ | 1.00438 | 7.71645 | 12.91730 | fW=4.41, fS=8.79, fT=13.24, f1=−8.535, f2=9.715, f3=26.537, |β23T|=1.549, f2/f3=0.366, f3/fT=2.004, |R22F|/f2=0.464, |R23R|/f2=0.456, |Rn/f1|=0.532, |fw/f_{2R}|=0.276, |ΔX3|/Y=2.073, ΔX3/ΔX2=1.226, 1/β2T=−0.250, Dw/fw=(3.99), f2/fw=(2.20), |R2b|/f2=0.46, |fw/f_{2F}|=(0.114)

| Embodiment 7 | | | |
|---|---|---|---|
| f = 4.44~8.78~13.25, F No. = 2.8~3.7~4.4 | | | |
| 2ω = 61.2°~32.8°~21.7° | | | |
| $r_1$ = 25.7756 (aspherical surface) | | | |
| | $d_1$ = 1.5879 | $n_1$ = 1.77250 | $v_1$ = 49.60 |
| $r_2$ = 5.6681 | | | |
| | $d_2$ = 2.5513 | | |
| $r_3$ = 20.7456 | | | |
| | $d_3$ = 1.2445 | $n_2$ = 1.58313 | $v_2$ = 59.38 |
| $r_4$ = 7.5238 | | | |
| | $d_4$ = 1.1886 | | |
| $r_5$ = 7.7066 | | | |
| | $d_5$ = 2.0230 | $n_3$ = 1.84666 | $v_3$ = 23.78 |
| $r_6$ = 11.6504 | | | |
| | $d_6$ = $D_1$ (variable) | | |
| $r_7$ = ∞ (stop) | | | |
| | $d_7$ = 0 | | |
| $r_8$ = 16.0681 | | | |
| | $d_8$ = 1.0000 | $n_4$ = 1.69350 | $v_4$ = 53.21 |
| $r_9$ = 47.9698 (aspherical surface) | | | |
| | $d_9$ = 0.2157 | | |
| $r_{10}$ = 5.6486 | | | |
| | $d_{10}$ = 1.8679 | $n_5$ = 1.74100 | $v_5$ = 52.64 |
| $r_{11}$ = −13.4522 | | | |
| | $d_{11}$ = 0.8327 | | |
| $r_{12}$ = −12.9172 | | | |
| | $d_{12}$ = 1.6811 | $n_6$ = 1.80518 | $v_6$ = 25.42 |
| $r_{13}$ = 6.8167 | | | |
| | $d_{13}$ = 1.3684 | | |
| $r_{14}$ = −41.9906 | | | |
| | $d_{14}$ = 1.5946 | $n_7$ = 1.69350 | $v_7$ = 53.21 |
| $r_{15}$ = 31.2370 (aspherical surface) | | | |
| | $d_{15}$ = $D_2$ (variable) | | |
| $r_{16}$ = 8.0174 | | | |
| | $d_{16}$ = 1.8839 | $n_8$ = 1.51633 | $v_8$ = 64.14 |
| $r_{17}$ = −23.5469 | | | |
| | $d_{17}$ = $D_3$ (variable) | | |
| $r_{18}$ = ∞ | | | |
| | $d_{18}$ = 0.8000 | $n_9$ = 1.51633 | $v_9$ = 64.14 |
| $r_{19}$ = ∞ | | | |
| | $d_{19}$ = 1.3600 | $n_{10}$ = 1.54771 | $v_{10}$ = 62.84 |
| $r_{20}$ = ∞ | | | |
| | $d_{20}$ = 0.8000 | | |
| $r_{21}$ = ∞ | | | |
| | $d_{21}$ = 0.7500 | $n_{11}$ = 1.51633 | $v_{11}$ = 64.14 |
| $r_{22}$ = ∞ | | | |
| | $d_{22}$ = 1.2000 | | |
| $r_{23}$ = ∞ (image) | | | | aspherical surface coefficients (1st surface) K=0, $A_2$=0, $A_4$=1.2716×10$^{-4}$, $A_6$=3.2199×10$^{-7}$, $A_8$=6.6503×10$^{-8}$ (9th surface) K=0, $A_2$=0, $A_4$=3.5003×10$^{-4}$, $A_6$=4.0513×10$^{-5}$, $A_8$=1.6543>10$^{-7}$ (15th surface) K=0, $A_2$=0, $A_4$=2.1346×10$^{-3}$, $A_5$=−1.3057×10$^5$, $A_8$=2.1992×10$^{-5}$ When focused on object at infinite distance

| f | 4.44 | 8.78 | 13.25 |
|---|---|---|---|
| $D_1$ | 14.48223 | 5.03859 | 1.25406 |
| $D_2$ | 1.09133 | 3.60873 | 2.32572 |
| $D_3$ | 1.22483 | 5.77625 | 11.33401 |

When focused on an object at a distance of 100 mm

| f | 4.44 | 8.78 | 13.25 |
|---|---|---|---|
| $D_1$ | 14.48223 | 5.03859 | 1.25406 |
| $D_2$ | 0.87438 | 2.93141 | 0.10262 |
| $D_3$ | 1.44178 | 6.45358 | 13.55711 | fW=4.44, fS=8.78, fT=13.25, f1=−8.864, f2=10.844, f3=11.824, |β23T|=1.493, f2/f3=0.917, f3/fT=0.893, |R22F|/f2=0.521, |R23R|/f2=0.629, |Rn/f1|=0.639, |fw/f$_{2R}$|=0.129, |ΔX3|/Y=2.023, ΔX3/ΔX2=0.891, 1/β2T=0.247, Dw/fw=(3.98), f2/fw=(2.24), |R2b|/f2=0.52, |fw/f$_{2R}$|=(0.129)

Embodiment 8 f = 4.41~8.82~13.28, F No. = 2.5~3.4~4.1
2ω = 61.4°~31.9°~21.5°
$r_1$ = −104.2415 (aspherical surface)
    $d_1$ = 1.2000    $n_1$ = 1.69350    $v_1$ = 53.21
$r_2$ = 5.3000
    $d_2$ = 3.3438
$r_3$ = 8.0044
    $d_3$ = 1.7471    $n_2$ = 1.80809    $v_2$ = 22.76
$r_4$ = 9.9324
    $d_4$ = $D_1$ (variable)
$r_5$ = ∞ (stop)
    $d_5$ = 0.2000
$r_6$ = 12.0603
    $d_6$ = 1.4500    $n_3$ = 1.69350    $v_3$ = 53.21
$r_7$ = −518.8844
    $d_7$ = 0.6334
$r_8$ = 5.9602
    $d_8$ = 2.2477    $n_4$ = 1.74100    $v_4$ = 52.64
$r_9$ = 35.0000
    $d_9$ = 1.0000    $n_5$ = 1.84666    $v_5$ = 23.78
$r_{10}$ = 6.0288
    $d_{10}$ = 0.9627
$r_{11}$ = 8.4031
    $d_{11}$ = 0.8000    $n_6$ = 1.52540    $v_6$ = 56.25
$r_{12}$ = 8.0498 (aspherical surface)
    $d_{12}$ = $D_2$ (variable)
$r_{13}$ = 58.0569
    $d_{13}$ = 2.0662    $n_7$ = 1.61533    $v_7$ = 64.14
$r_{14}$ = −10.8016
    $d_{14}$ = $D_2$ (variable)
$r_{15}$ = ∞
    $d_{15}$ = 0.8000    $n_8$ = 1.51633    $v_8$ = 64.14
$r_{16}$ = ∞
    $d_{16}$ = 1.3600    $n_9$ = 1.54771    $v_9$ = 62.84
$r_{17}$ = ∞
    $d_{17}$ = 0.8000
$r_{18}$ = ∞
    $d_{18}$ = 0.7500    $n_{10}$ = 1.51633    $v_{10}$ = 64.14
$r_{19}$ = ∞
    $d_{19}$ = 1.2000
$r_{20}$ = ∞ (image)

aspherical surface coefficients (1st surface) K=0, $A_2$=0, $A_4$=5.2742×10$^{-4}$, $A_6$=1.0626×10$^{-5}$, $A_8$=1.6927×10$^{-7}$ (12th surface) K=0, $A_2$=0, $A_4$=−2.3060×10$^{-3}$, $A_6$=−8.1827×10$^6$, $A_8$=8.0844×10$^{-6}$ When focused on object at infinite distance

| f | 4.41 | 8.82 | 13.28 |
|---|---|---|---|
| $D_1$ | 13.91370 | 5.06449 | 1.40646 |
| $D_2$ | 1.11092 | 4.87076 | 9.20261 |
| $D_3$ | 2.56700 | 5.55500 | 10.22300 |

When focused on an object at a distance of 100 mm

| f | 4.41 | 8.82 | 13.28 |
|---|---|---|---|
| $D_1$ | 13.91370 | 5.06449 | 1.40646 |
| $D_2$ | 0.81599 | 3.95939 | 7.45519 |
| $D_3$ | 2.86196 | 6.46634 | 11.97012 | fW=4.41, fS=8.82, fT=13.28, f1=−9.208, f2=10.701, f3=17.820, |β23T|=1.440, f2/f3=0.601, f3/fT=1.342, |R22F|/f2=0.557, |R23R|/f2=0.563, |Rn/f1|=0.576, |fw/f$_{2R}$|=0.259, |ΔX3|/Y=1.531, ΔX3/ΔX2=0.486, 1/β2T=0.135, Dw/fw=(4.07), f2/fw=(2.43), |R2b|/f2=0.56, |fw/f$_{2R}$|=(0.259)

Embodiment 9 f = 4.39~7.36~13.28, F No. = 2.74~3.08~3.83
2ω = 59.3°~37.5°~21.3°
$r_1$ = 50.0880
    $d_1$ = 2.3000    $n_1$ = 1.84666    $v_1$ = 23.78
$r_2$ = −35.1849
    $d_2$ = 0.2000
$r_3$ = −65.7634
    $d_3$ = 1.0000    $n_2$ = 1.72916    $v_2$ = 54.68
$r_4$ = 4.4610
    $d_4$ = 3.1218
$r_5$ = 13.0318 (aspherical surface)
    $d_5$ = 1.1000    $n_3$ = 1.49241    $v_3$ = 57.66
$r_6$ = 19.9534
    $d_6$ = $D_1$ (variable)
$r_7$ = ∞ (stop)
    $d_7$ = 1.0000
$r_8$ = 14.3782 (aspherical surface)
    $d_8$ = 1.0000    $n_4$ = 1.49241    $v_4$ = 57.66
$r_9$ = 19.8421
    $d_9$ = 0.1000
$r_{10}$ = 5.4400
    $d_{10}$ = 2.5000    $n_5$ = 1.51633    $v_5$ = 64.14
$r_{11}$ = −52.8689
    $d_{11}$ = 1.0000    $n_6$ = 1.78470    $v_6$ = 26.29
$r_{12}$ = 14.9521
    $d_{15}$ = 0.8000
$r_{13}$ = −987.0956
    $d_{13}$ = 1.2000    $n_7$ = 1.49241    $v_7$ = 57.66
$r_{14}$ = 982.9308 (aspherical surface)
    $d_{14}$ = $D_2$ (variable)
$r_{15}$ = 15.7957
    $d_{15}$ = 1.8000    $n_8$ = 1.48749    $v_8$ = 70.23
$r_{16}$ = −17.0241
    $d_{16}$ = $D_2$ (variable)
$r_{17}$ = ∞
    $d_{17}$ = 1.9000    $n_9$ = 1.54771    $v_9$ = 62.84
$r_{18}$ = ∞
    $d_{18}$ = 0.8000
$r_{19}$ = ∞
    $d_{19}$ = 0.7500    $n_{10}$ = 1.51633    $v_{10}$ = 64.14
$r_{20}$ = ∞
    $d_{20}$ = 1.15
$r_{21}$ = ∞ (image)

aspherical surface coefficients (5th surface) K=0, $A_2$=0, $A_4$=8.6004×10$^{-4}$, $A_6$=−1.3646×10$^{-5}$, $A_8$=1.6576×10$^{-6}$, $A_{10}$=0

(8th surface) K=0, $A_2$=0, $A_4$=−2.8930×10$^{-5}$, $A_6$=6.0475×10$^{-6}$, $A_8$=−1.4072×10$^{-7}$, $A_{10}$=0

(14th surface) K=0, $A_2$=0, $A_4$=1.6825×10$^{-3}$, $A_6$=1.0800×10$^{-5}$, $A_8$=3.9927×10$^{-6}$, $A_{10}$=0

When focused on object at infinite distance

| f | 4.39 | 7.36 | 13.28 |
|---|---|---|---|
| $D_1$ | 18.29793 | 7.99696 | 1.40000 |
| $D_2$ | 3.72779 | 2.79199 | 3.65481 |
| $D_3$ | 6.49849 | 10.56281 | 18.38607 |

When focused on an object at a distance of 100 mm

| f | 4.39 | 7.36 | 13.28 |
|---|---|---|---|
| $D_1$ | 18.29793 | 7.99696 | 1.40000 |
| $D_2$ | 3.52350 | 2.27425 | 1.50000 |
| $D_3$ | 6.70278 | 11.08055 | 20.54088 | f2=17.12, f3=17.72, $|\beta 23T|$=1.46, f2/f3=1.000, f3/fT=1.29, $|R22F|/f2$=(5.400), $|R23R|/f2$=(14.952), $|Rn/f1|$=0.490, fw/f1P=0.061, $|fw/f_{2R}|$=0.004, $|\Delta X3|/Y$=2.378, $\Delta X3/\Delta X2$=1.010, $1/\beta 2T$=0.22, Dw/fw=5.52, f2/fw=3.90, $|2b|/f2$=0.32, $|fw/fp|$=0.061 (image side lens element in first lens unit), 0.044 (object side lens element in second lens unit), 0.004 (image side lens element in second lens unit), $|f_1/f_{13}|$=0.126, $|f_1/f_{11}|$=0.061, $|fw/f_{2R}|$=0.44

Embodiement 10 f = 4.33~8.67~13.10, F No. = 2.86~3.80~4.87
2ω = 60°~32.2°~21.6°
$r_1$ = 34.5719
    $d_1$ = 2.0000    $n_1$ = 1.52540    $v_1$ = 56.25
$r_2$ = 39.2868 (aspherical surface)
    $d_2$ = 1.3000
$r_3$ = −20.0546
    $d_3$ = 1.0000    $n_2$ = 1.63854    $v_2$ = 55.38
$r_4$ = 5.2000
    $d_4$ = 3.5745
$r_4$ = 9.3216
    $d_5$ = 1.4617    $n_3$ = 1.80518    $v_3$ = 25.42
$r_6$ = 14.0641
    $d_6$ = $D_1$ (variable)
$r_7$ = ∞ (stop)
    $d_7$ = 0
$r_8$ = 4.4179 (aspherical surface)
    $d_8$ = 0.8000    $n_4$ = 1.52540    $v_4$ = 56.25
$r_9$ = 4.0737
    $d_9$ = 0.6355
$r_{10}$ = 5.5000
    $d_{10}$ = 2.0000    $n_5$ = 1.77250    $v_5$ = 49.60
$r_{11}$ = −12.800
    $d_{11}$ = 0.8000    $n_6$ = 1.80809    $v_6$ = 22.76
$r_{12}$ = 23.4461
    $d_{12}$ = 1.4502
$r_{13}$ = 6.0905 (aspherical surface)
    $d_{13}$ = 1.0000    $n_7$ = 1.52540    $v_7$ = 56.25
$r_{14}$ = 5.0127
    $d_{14}$ = $D_2$ (variable)
$r_{15}$ = −94.6826
    $d_{15}$ = 1.4000    $n_8$ = 1.51633    $v_8$ = 64.14
$r_{16}$ = −14.1789
    $d_{16}$ = $D_3$ (variable)
$r_{17}$ = ∞
    $d_{17}$ = 0.8000    $n_9$ = 1.51633    $v_9$ = 64.14
$r_{18}$ = ∞
    $d_{18}$ = 1.3600    $n_{10}$ = 1.54771    $v_{10}$ = 62.84
$r_{19}$ = ∞
    $d_{19}$ = 0.8000
$r_{20}$ = ∞
    $d_{20}$ = 0.7500    $n_{11}$ = 1.51633    $v_{11}$ = 94.14
$r_{21}$ = ∞
    $d_{21}$ = 1.2000
$r_{22}$ = ∞ (image)

aspherical surface coefficients
(2nd surface) K=0, $A_2$=0, $A_4$=−6.2517×10$^{-4}$, $A_6$=2.2895×10$^{-6}$, $A_8$=4.3661×10$^{-8}$, $A_{10}$=0
(8th surface) K=0, $A_2$=0, $A_4$=−5.3350×10$^{-5}$, $A_6$=4.1213×10$^{-7}$, $A_8$=−8.8818×10$^{-7}$, $A_{10}$=0
(13th surface) K=0, $A_2$=0, $A_4$=−2.2384×10$^{-3}$, $A_6$=−6.4370×10$^{-5}$, $A_8$=−3.7447×10$^7$, $A_{10}$=0

When focused on object at infinite distance

| f | 4.33 | 8.67 | 13.10 |
|---|---|---|---|
| $D_1$ | 13.81397 | 4.20997 | 1.28197 |
| $D_2$ | 2.20675 | 4.44595 | 9.13211 |
| $D_3$ | 1.59012 | 4.52960 | 6.08009 |

When focused on an object at a distance of 100 mm

| f | 4.33 | 8.67 | 13.10 |
|---|---|---|---|
| $D_1$ | 13.81397 | 4.20997 | 1.28197 |
| $D_2$ | 1.70301 | 3.03065 | 6.40508 |
| $D_3$ | 2.09386 | 5.94491 | 8.80712 | f2=9.81, f3=32.11, $|\beta 23T|$=1.41, f2/f3=0.306, f3/fT=2.45, $|R22F|/f2$=0.561, $|R23R|/f2$=(2.390), $|Rn/f1|$=0.558, $|fw/f_{2R}|$=0.055, $|\Delta X3|/Y$=0.898, $\Delta X3/\Delta X2$=0.393, $1/\beta 2T$=−0.488, Dw/fw=(3.98), f2/fw−(2.27), $|R2b|/f2$=0.45, $|fw/fp|$= 0.009 (object side lens element in first lens unit), 0.009 (object side lens element in second lens unit), 0.055 (image side lens element in second lens unit), $|f_1/f_{11}|$=0.019, $|f_1/f_{13}|$=0.009, $|fw/f_{2F}|$=0.009

Embodiment 11 f = 4.39~7.36~13.28, F No. = 2.78~3.28~4.35,
2ω = 59.3°~37.5°~21.3°
$r_1$ = 7.2293
    $d_1$ = 1.5000    $n_1$ = 1.52540    $v_1$ = 56.25
$r_2$ = 5.8997 (aspherical surface)
    $d_2$ = 1.4000
$r_3$ = 72.0533
    $d_3$ = 1.0000    $n_2$ = 1.72916    $v_2$ = 54.68
$r_4$ = 3.7137
    $d_4$ = 1.8000
$r_5$ = 5.3208
    $d_5$ = 1.5235    $n_3$ = 1.78470    $v_3$ = 26.29
$r_6$ = 7.3093
    $d_6$ = $D_1$ (variable)
$r_7$ = ∞ (stop)
    $d_7$ = 1.0000
$r_8$ = 4.6247 (aspherical surface)
    $d_8$ = 2.5000    $n_4$ = 1.69350    $v_4$ = 53.21
$r_9$ = −13.2200
    $d_9$ = 1.0000    $n_5$ = 1.78470    $v_5$ = 26.29
$r_{10}$ = 9.8161
    $d_{10}$ = 0.6000
$r_{11}$ = 8.9607 (aspherical surface)
    $d_{11}$ = 1.0589    $n_6$ = 1.52540    $v_6$ = 56.25
$r_{12}$ = 9.9956
    $d_{12}$ = $D_2$ (variable)
$r_{10}$ = 10.8186
    $d_{13}$ = 1.7000    $n_7$ = 1.48749    $v_7$ = 70.23
$r_{14}$ = −34.4570
    $d_{14}$ = $D_3$ (variable)
$r_{15}$ = ∞
    $d_{15}$ = 1.9000    $n_8$ = 1.54771    $v_8$ = 62.84
$r_{16}$ = ∞
    $d_{16}$ = 0.8000
$r_{17}$ = ∞
    $d_{17}$ = 0.7500    $n_9$ = 1.51633    $v_9$ = 64.14

-continued

Embodiment 11

$r_{18} = \infty$
$\quad d_{18} = 1.15$
$r_{19} = \infty$ (image)

aspherical surface coefficients (2nd surface) $K=0$, $A_2=0$, $A_4=-3.2448\times10^{-4}$, $A_6=-5.7220\times10^{-5}$, $A_8=-2.5069\times10^{-7}$, $A_{10}=0$ (8th surface) $K=0$, $A_2=0$, $A_4=2.6425\times10^{-4}$, $A_6=-1.1410\times10^{-5}$, $A_8=1.6780\times10^{-6}$, $A_{10}=0$ (11th surface) $K=0$, $A_2=0$, $A_4=-4.3533\times10^{-3}$, $A_6=-9.7990\times10^{5}$, $A_8=-4.1447\times10^{-5}$, $A_{10}=0$ When focused on object at infinite distance

| f | 4.39 | 7.36 | 13.28 |
|---|---|---|---|
| $D_1$ | 12.05238 | 5.51069 | 1.40000 |
| $D_2$ | 3.80706 | 3.23467 | 3.30769 |
| $D_3$ | 2.45821 | 6.38167 | 13.60995 |

When focused on an object at a distance of 100 mm

| f | 4.39 | 7.36 | 13.28 |
|---|---|---|---|
| $D_1$ | 12.05238 | 5.51069 | 1.40000 |
| $D_2$ | 3.53882 | 2.65713 | 1.50000 |
| $D_3$ | 2.72645 | 6.95921 | 15.41765 |

$f2=10.27$, $f3=17.1$, $|\beta 23T|=-1.73$, $f2/f3=0.601$, $f3/fT=1.29$, $f3/fT=1.288$, $|Rn/f1|=0.498$, $|fw/f_{2R}|=0.036$, $|\Delta X3|/Y=2.230$, $\Delta X3/\Delta X2=1.047$, $1/\beta 2T=0.035$, $Dw/fw=(4.26)$, $f2/fw-(2.34)$, $|R2b|/f2=0.45$, $|fw/fP|=0.044$ (object side lens element in first lens unit), 0.036 (image side lens element in second lens unit), $|f_1/f_{11}|=0.075$, $|fw/f_{2R}|=(0.838)$

Embodiment 12

$f = 4.39\sim7.36\sim13.28$, F No. $= 2.78\sim3.28\sim4.37$
$2\omega = 59.3°\sim37.5°\sim21.3°$
$r_1 = 8.3849$
$\quad d_1 = 1.7982 \qquad n_1 = 1.58423 \qquad \nu_1 = 30.49$
$r_2 = 9.8428$ (aspherical surface)
$\quad d_2 = 0.6000$
$r_3 = 28.0540$
$\quad d_3 = 1.0000 \qquad n_2 = 1.72916 \qquad \nu_2 = 54.68$
$r_4 = 3.5362$
$\quad d_4 = 3.0222$
$r_5 = 12.8838$ (aspherical surface)
$\quad d_5 = 1.2000 \qquad n_3 = 1.58423 \qquad \nu_3 = 30.49$
$r_6 = 18.5909$
$\quad d_6 = D_1$ (variable)
$r_7 = \infty$ (stop)
$\quad d_7 = 1.0000$
$r_8 = 26.1792$ (aspherical surface)
$\quad d_8 = 1.2000 \qquad n_4 = 1.52540 \qquad \nu_4 = 56.25$
$r_9 = 51.3543$
$\quad d_9 = 0.1000$
$r_{10} = 4.6180$
$\quad d_{10} = 3.5500 \qquad n_5 = 1.58913 \qquad \nu_5 = 61.14$
$r_{11} = -7.4000$
$\quad d_{11} = 1.0000 \qquad n_6 = 1.83400 \qquad \nu_6 = 37.16$
$r_{12} = 25.0466$
$\quad d_{12} = 0.6000$
$r_{13} = -16.5805$
$\quad d_{13} = 1.0589 \qquad n_7 = 1.52540 \qquad \nu_7 = 56.25$ -continued

Embodiment 12

$r_{14} = -24.7585$ (aspherical surface)
$\quad d_{14} = D_2$ (variable)
$r_{15} = 7.9289$
$\quad d_{15} = 1.8000 \qquad n_8 = 1.48749 \qquad \nu_8 = 70.23$
$r_{16} = 39.2941$
$\quad d_{16} = D_3$ (variable)
$r_{17} = \infty$
$\quad d_{17} = 1.9000 \qquad n_9 = 1.54771 \qquad \nu_9 = 62.84$
$r_{18} = \infty$
$\quad d_{18} = 0.8000$
$r_{19} = \infty$
$\quad d_{19} = 0.7500 \qquad n_{10} = 1.51633 \qquad \nu_{10} = 64.14$
$r_{20} = \infty$
$\quad d_{20} = 1.15$
$r_{21} = \infty$ (image)

aspherical surface coefficients (2nd surface) $K=0$, $A_2=0$, $A_4=-5.6589\times10^{-5}$, $A_6=-3.9492\times10^{5}$, $A_8=6.8699\times10^{-7}$, $A_{10}=0$ (5th surface) $K=0$, $A_2=0$, $A_4=1.3917\times10^{-3}$, $A_6=-7.5570\times10^{-5}$, $A_8=7.7507\times10^{-6}$, $A_{10}=0$ (8th surface) $K=0$, $A_2=0$, $A_4=-8.7478\times10^{-5}$, $A_6=1.2731\times10^{-5}$, $A_8=9.8692\times10^{-7}$, $A_{10}=0$ (14th surface) $K=0$, $A_2=0$, $A_4=3.1309\times10^{-3}$, $A_6=1.0134\times10^{-4}$, $A_8=1.5628\times10^{-5}$, $A_{10}=0$ When focused on object at infinite distance

| f | 4.39 | 7.36 | 13.28 |
|---|---|---|---|
| $D_1$ | 13.24697 | 5.96984 | 1.40000 |
| $D_2$ | 2.77930 | 2.08223 | 3.25837 |
| $D_3$ | 3.44990 | 7.46635 | 14.81779 |

When focused on an object at a distance of 100 mm

| f | 4.39 | 7.36 | 13.28 |
|---|---|---|---|
| $D_1$ | 13.24697 | 5.96984 | 1.40000 |
| $D_2$ | 2.51945 | 1.50000 | 1.50000 |
| $D_3$ | 3.70974 | 8.04858 | 16.57617 |

$f2=11.72$, $f3=20.0$, $|\beta 23T|=1.70$, $f3/fT=1.51$, $|R22F|/f2=0.394$, $|R23R|/f2=(2.136)$, $|Rn/f1|=0.454$, $|fw/f_{2R}|=0.044$, $|\Delta X3|/Y=2.274$, $\Delta X3/\Delta X2=0.960$, $1/\beta 2T=0.00$, $Dw/fw=(4.82)$, $f2/fw=(2.67)$, $|R2b|/f2=0.39$, $|fw/fP|=0.066$ (object side lens element in first lens unit), 0.066 (image side lens element in first lens unit), 0.044 (object side lens element in second lens unit), 0.044 (image side lens element in second lens unit), $f2/f3=0.586$, $|f_1/f_{11}|=0.117$, $|f_1/f_{13}|=0.117$, $|fw/f_{2R}|=0.044$ wherein reference symbols $r_1, r_2, \ldots$ represent radii of curvature on surfaces of respective lens element, reference symbols $d_1, d_2, \ldots$ designate thicknesses of the respective lens elements and airspaces reserved between the respective lens elements, reference symbols $n_1, n_2, \ldots$ denote refractive indices of the respective lens elements and reference symbols $\nu_1, \nu_2, \ldots$ represent Abbe's numbers of the respective lens elements. In addition, lengths such as $r_1, r_2, \ldots d_1, d_2, \ldots$ and the like are specified in a unit of millimeter.

Out of values mentioned in the above described embodiments, those which are parenthesized are out of ranges defined by the conditions.

Furthermore, a maximum image height (a diagonal length of an image pickup surface/2) is 2.5 mm in the above described embodiments.

Out of the above described embodiments, the first through eighth embodiment have the first composition according to the present invention.

The first embodiment has a composition shown in FIG. 1, comprises a first lens unit G1 having negative refractive power, a second lens unit G2 having positive refractive power and a third lens unit G3 having positive refractive power, and changes a magnification prom a wide-angle position to a telephoto position by moving the first lens unit G1 along an optical axis and displacing the second lens unit G2 and the third lens unit G3 for different distances on the object side along the optical axis.

In the zoom lens system according to the present invention, the first lens unit G1 consists of a positive lens element, a negative meniscus lens element, a negative lens element and a positive meniscus lens element, the second lens unit consists of a positive lens element, a cemented lens component consisting of a positive lens element and a negative lens element, and a positive lens element, and the third lens unit consists of a single positive lens element.

In the first embodiment, an image side service ($r_{10}$) of a most image side positive lens element of the second lens unit G2 is an aspherical surface and the positive lens element of the third lens unit G3 has two aspherical surfaces.

The first embodiment satisfies the conditions (1), (1-1), (2), (2-1), (3), (3-1), (4), (4-1), (5), (5-1), (6), (6-1), (8), (9), (9-1), (9-2), (10), (11), (12), (13), (14) and (15).

Figure 2:
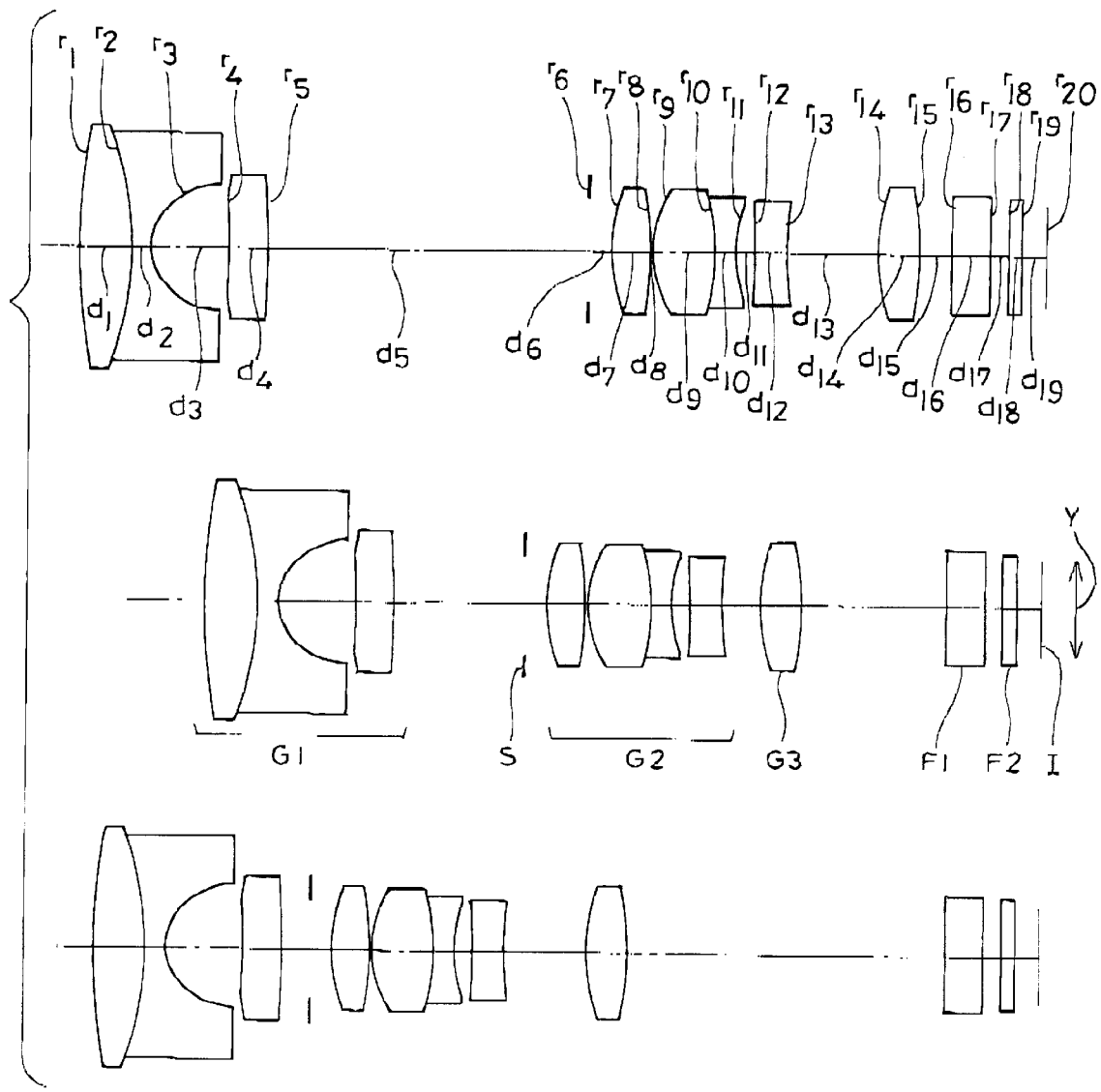

The second embodiment comprises a first negative lens unit G1, a second positive lens unit G2 and a third positive lens unit G3 as shown in FIG. 2, and changes a magnification from a wide-angle position to a telephoto position by moving the first lens unit G1 along an optical axis, and displacing the second lens unit G2 and the third lens unit G3 for different distances on the object side along the optical axis.

The first lens unit G1 consists of a cemented lens component consisting of a positive lens element and a negative lens element and a negative lens element, the second lens unit G2 consists of a positive lens element, a cemented lens component consisting of a positive lens element and a negative lens element, and a negative lens element, and the third lens unit G3 consists of a single positive lens element.

In the second embodiment, an object side surface ($r_4$) of the negative lens element and an image side surface ($r_{13}$) of a most image side negative lens element of the second lens unit G2 are aspherical surfaces, and the positive lens element of the third lens unit G3 has two spherical surfaces. Furthermore, the second embodiment satisfies the conditions (1), (1-1), (2), (2-1), (3), (3-1), (4), (4-1), (5), (5-1), (6), (6-1), (8), (9), (9-1), (9-2), (10), (11), (12), (13), (14), (15), (16), (18) and (23).

Figure 3:
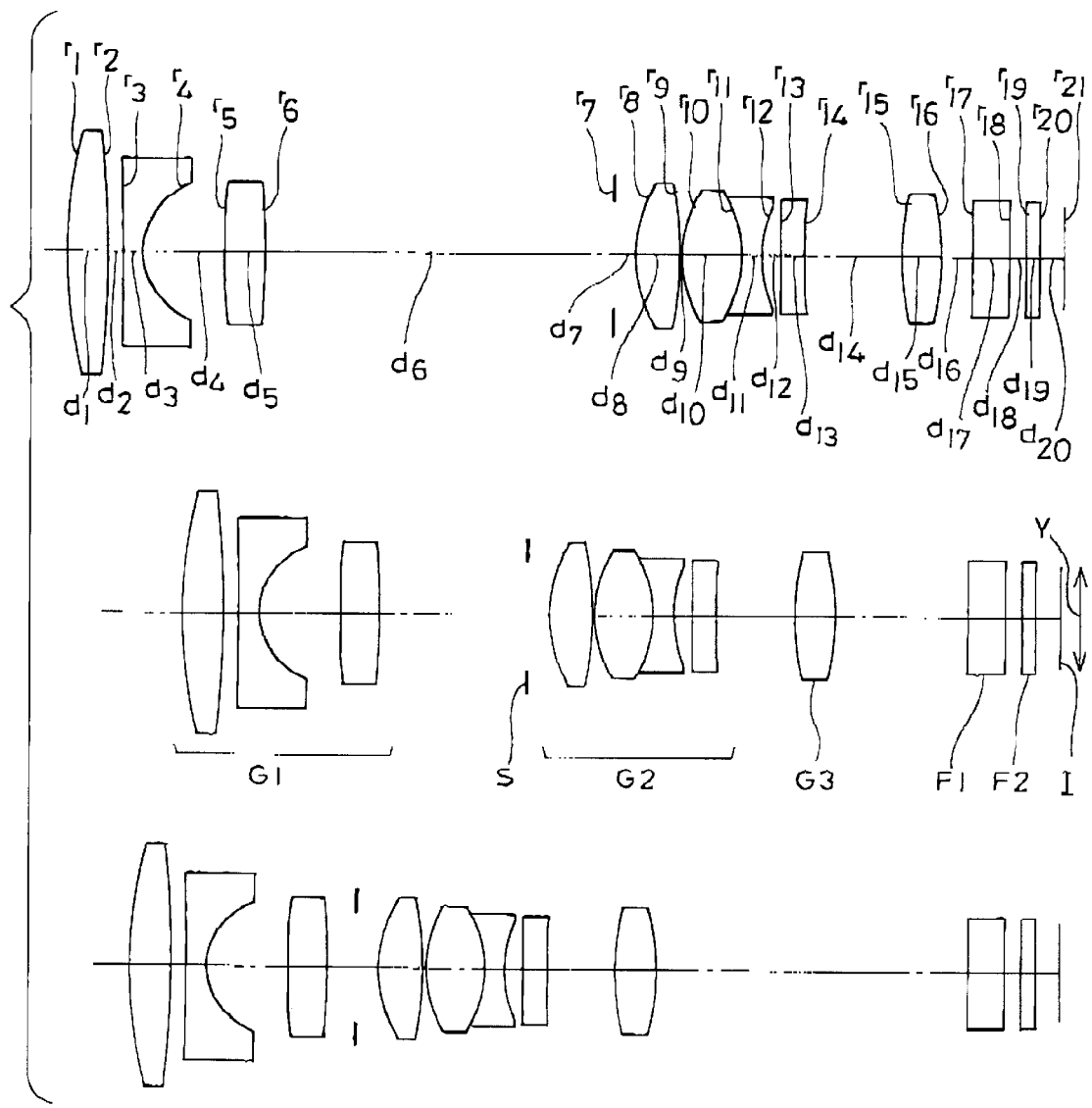
Figure 4:
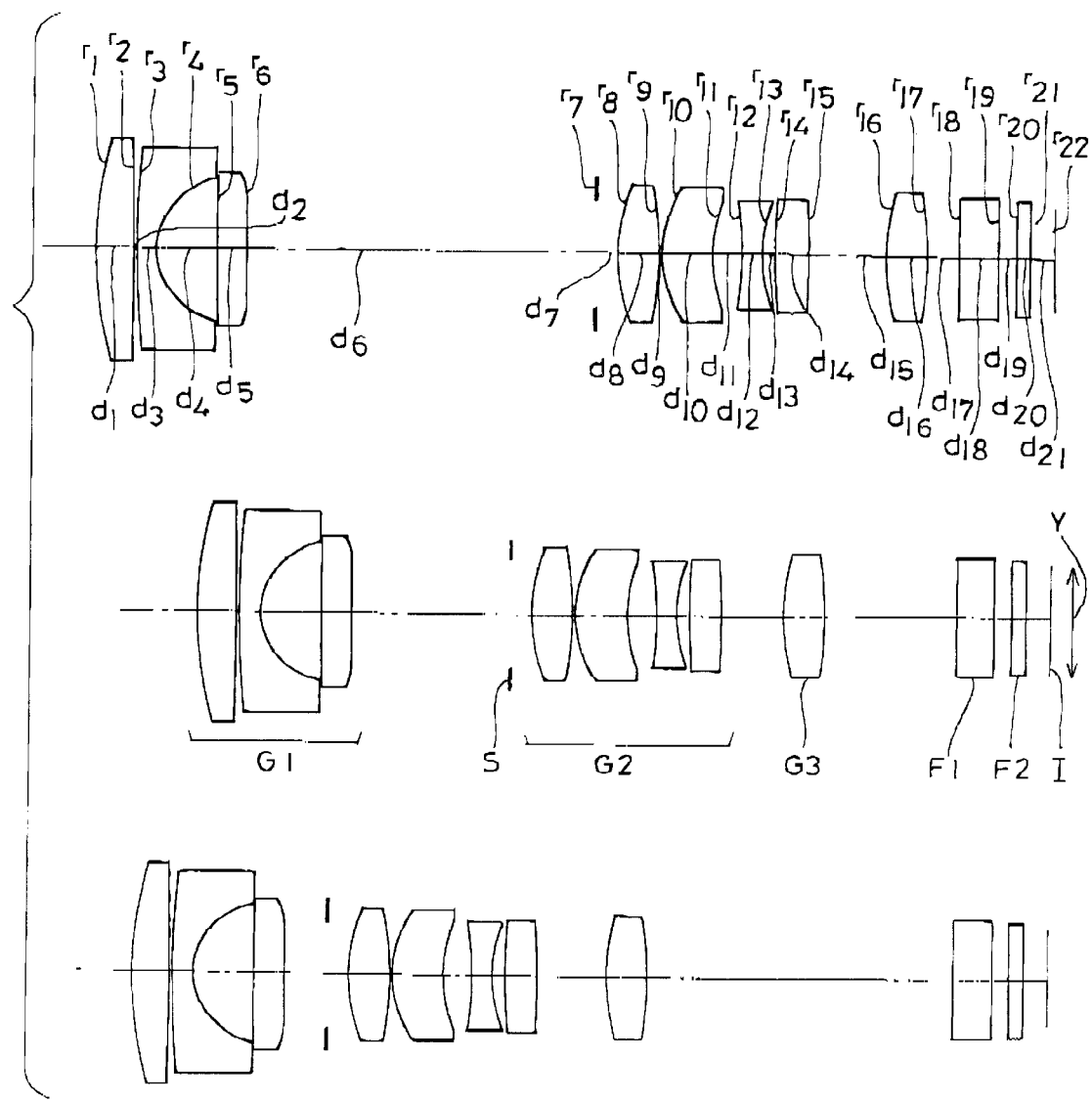

The third embodiment comprises a first negative lens unit G1, a second positive lens unit G2 and a third positive lens unit G3 a shown in FIG. 3, and changes a magnification from a wide-angle position to a telephoto position by moving the first lens unit G1 along an optical axis and displacing the second lens unit G2 and the third lens unit G3 on the object side.

Furthermore, the first lens unit G1 consists of a positive lens element, a negative lens element and a positive lens element, the second lens unit G2 consists of a positive lens element, a cemented lens component consisting of a positive lens element and a negative lens element, and positive lens element, and the third lens unit consists of a single positive lens element. In the third embodiment, an object side surface ($r_5$) of the image side positive lens element of the first lens unit G1 and an image side surface ($r_{14}$) of the most image side positive lens element of the second lens unit are aspherical surfaces, and the positive lens element of the third lens unit has two spherical surfaces. The third embodiment satisfies the conditions (1), (1-2), (3), (3-1), (4), (4-1), (5), (5-1), (6), (6-1), (7), (7-1), (7-2), (8), (9), (9-1), (9-2) and (10).

Furthermore, the third embodiment satisfies also the conditions (11), (11-1), (12), (12-1), (13), (13-1), (14), (14-1), (15), (16) and (23).

Figure 5:
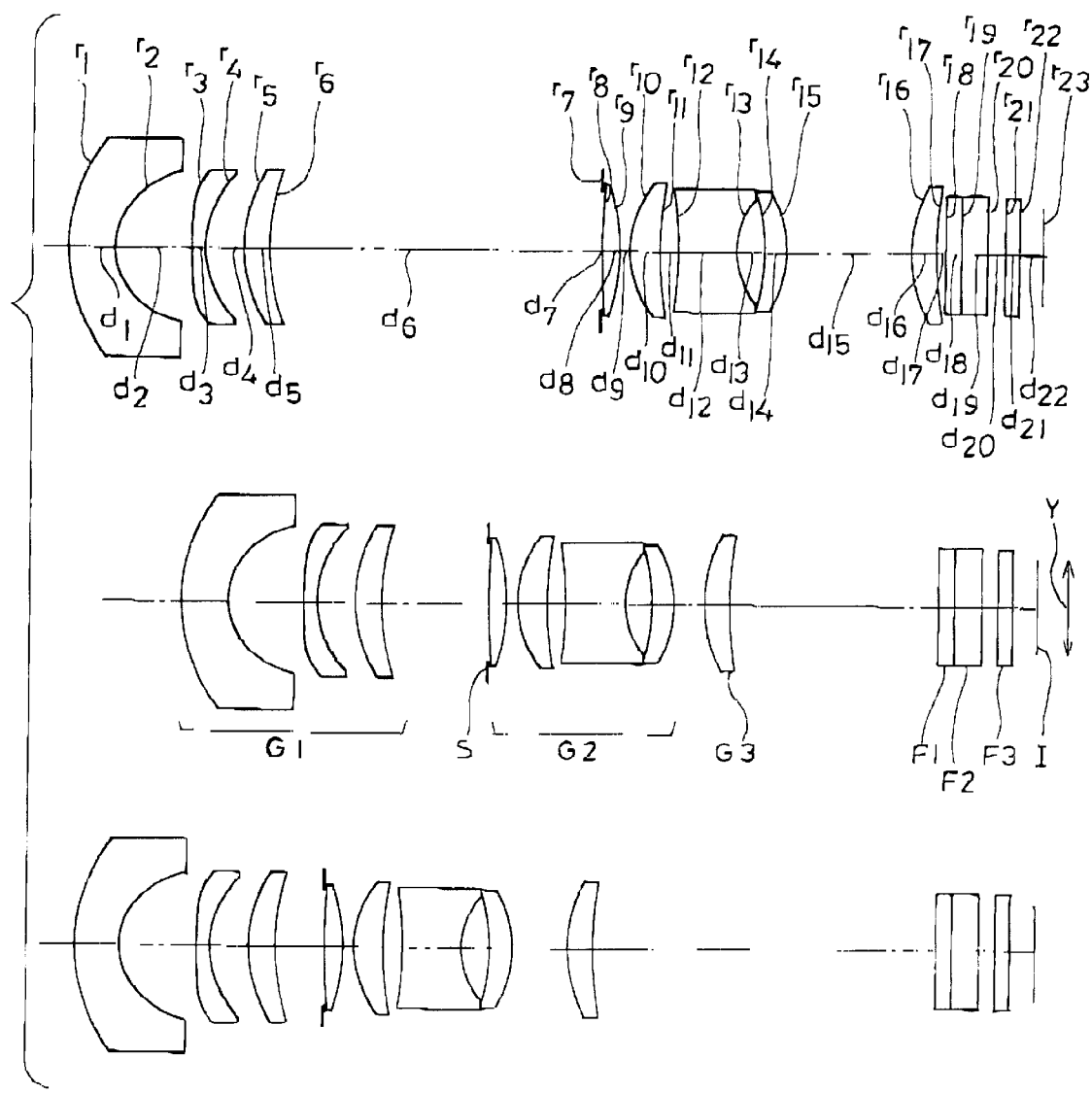

The fourth embodiment comprises a first negative lens unit G1 a second positive lens unit G2 and a third positive lens unit G3 as shown in FIG. 5, and changes a magnification from a wide-angle position to a telephoto position by moving the first lens unit G1 along an optical axis, and displacing the second lens unit G2 and the third lens unit G3 for different distances on the object side.

The first lens unit G1 consists of a positive lens element, a negative lens element and a negative lens element, the second lens unit G2 consists of a positive lens element, a positive lens element, a negative lens element and a positive lens element, and the third lens unit G3 consists of a single positive lens element.

In the fourth embodiment, an image side surface ($r_6$) of the most image side negative lens element of the first lens unit G1 and an object side surface ($r_{14}$) of the most image side positive lens element of the second lens unit G2 are aspherical surfaces, and the positive lens element of the third lens unit G3 has two spherical surfaces. The fourth embodiment satisfies the conditions (1), (1-1), (2), (2-1), (3), (3-1), (4), (4-1), (5), (5-1), (6), (6-1), (8), (9), (9-1), (9-2) and (10).

The fifth embodiment comprises a first negative lens unit G1, a second positive lens unit G2 and a third positive lens unit G3 as shown in FIG. 5, and changes a magnification from a wide-angle position to a telephoto position by moving the first lens unit G1 along an optical axis, and displacing the second lens unit G2 and the third lens unit G3 for different distances on the object side.

Furthermore, the first lens unit G1 consists of a negative lens element, a negative lens element and a positive lens element, the second lens unit G2 consists of a positive lens element, a positive lens element, a negative lens element and a positive lens element, and the third lens unit G3 consists of a single positive ions element.

In the fifth embodiment, an object side surface ($r_{13}$) of the second object side lens element (negative lens element) and an image side surface ($r_{15}$) of the most image side positive lens element of the second lens unit G2 are aspherical surfaces, and the positive lens element of the third lens unit G3 has two spherical surfaces. The fifth embodiment satisfies the conditions (1), (1-1), (2), (2-1), (3), (3-1), (4), (4-1), (5), (5-1), (6), (6-1), (8), (9), (9-1), (9-2) and (10).

Figure 6:
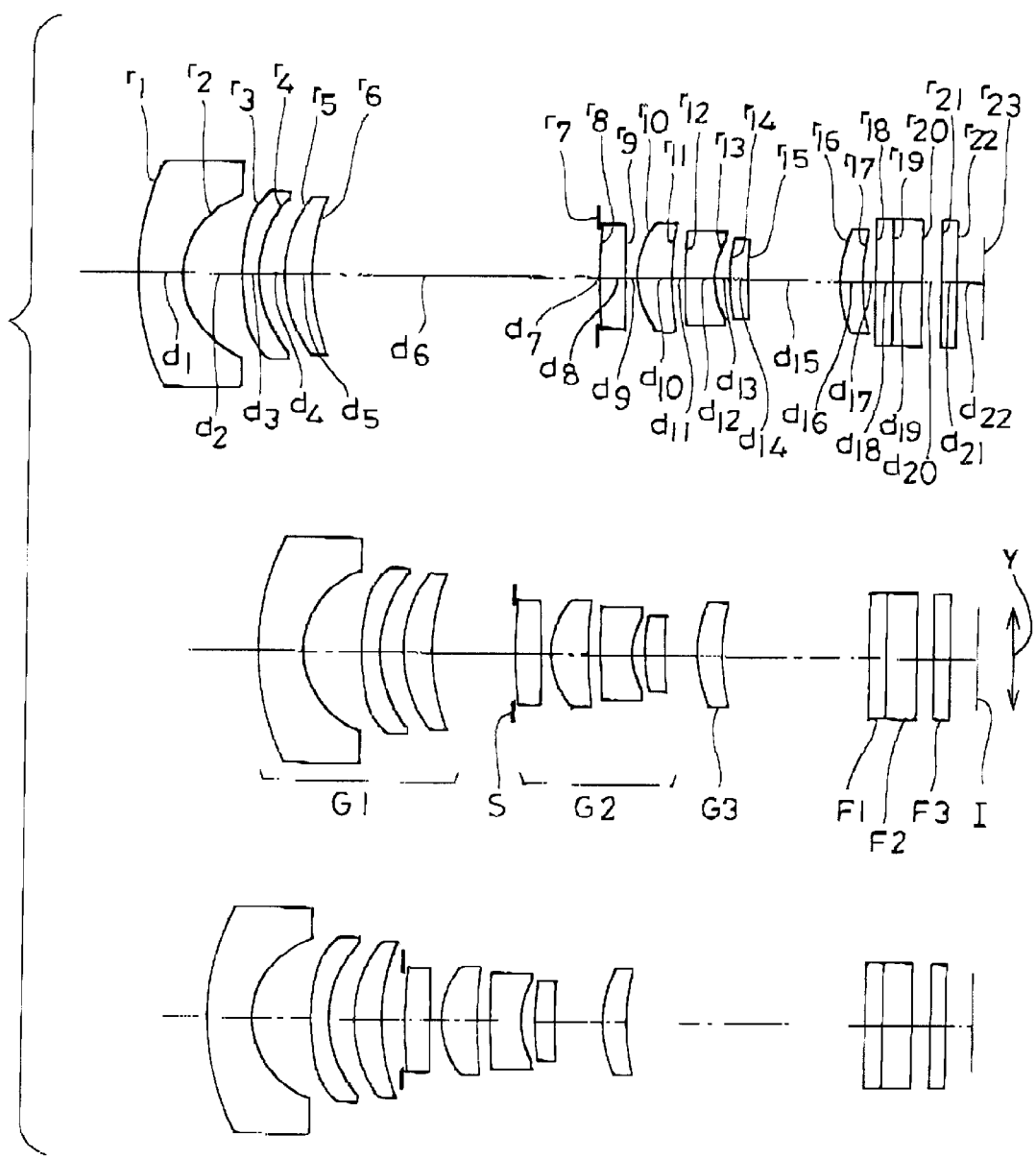

The sixth embodiment comprises a first negative lens unit G1, a second positive lens unit G2 and a third positive lens unit G3 as shown in FIG. 6, and changes a magnification from a wide-angle position to a telephoto position by moving the first lens unit along an optical axis, and displacing the second lens unit G2 and the third lens unit G3 for different distances respectively on the object side.

Furthermore, the first lens unit G1 consists of a negative lens element, a negative lens element and a positive lens element, the second lens unit G2 consists of a positive lens element, a positive lens element a negative lens element and a positive lens element, and the third lens unit G3 consists of a positive lens element.

In the sixth embodiment, an object side surface ($r_3$) of the second lens element (negative lens element) of the first lens unit G1, an object side surface ($r_{10}$) of the second lens element (positive lens element) of the second lens unit G2 and a most image side surface ($r_{15}$) of the second lens unit G2 are aspherical surfaces, and the positive lens element of the third lens unit G3 has two spherical surfaces. Furthermore, the sixth embodiment satisfies the conditions (1), (1-1), (2), (2-1), (3), (3-1), (4), (4-1), (5), ( 5-1), (6), (6-1), (8), (9), (9-1), (9-2) and (10).

Figure 7:
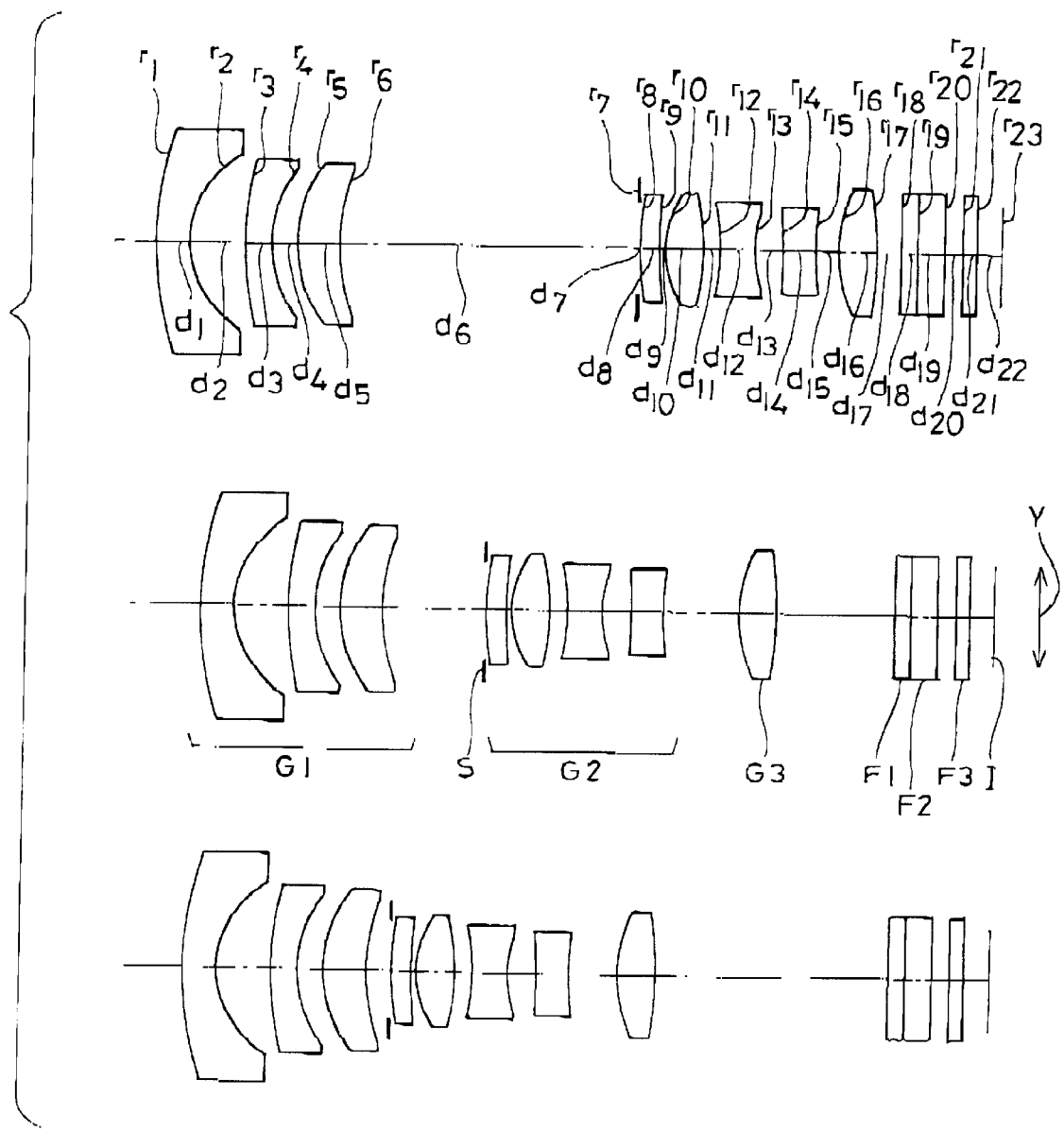

The seventh embodiment comprises a first negative lens unit G1, a second positive lens unit G2 and a third positive lens unit G3 as shown in FIG. 7, and changes a magnification from a wide-angle position to a telephoto position by moving the first lens unit G1 along an optical axis, and displacing the second lens unit G2 and the third lens unit G3 for different distance on the object side.

Furthermore, the first lens unit G1 consists of a negative lens element, a negative lens element and a positive lens element, the second lens unit G2 consists of a positive lens element, a positive lens element, a negative lens element and a negative lens element, and the third lens unit G3 consists of a positive lens element.

In the seventh embodiment, an object side surface ($r_1$) of the most object side lens element of the first lens unit G1, an image side surface ($r_9$) of the most object side lens element (positive lens element) of the second lens unit G2 and an image side surface ($r_{15}$) of the most image side lens element (negative lens element) of the second lens unit G2 are aspherical surface. Furthermore, the third lens unit G3 has two spherical surfaces.

Furthermore, the seventh embodiment satisfies the conditions (1), (1-1), (2), (2-1), (3), (3-1), (4), (4-1), (5), (5-1), (6), (8), (9), (9-1), (9-2) and (10).

Figure 8:
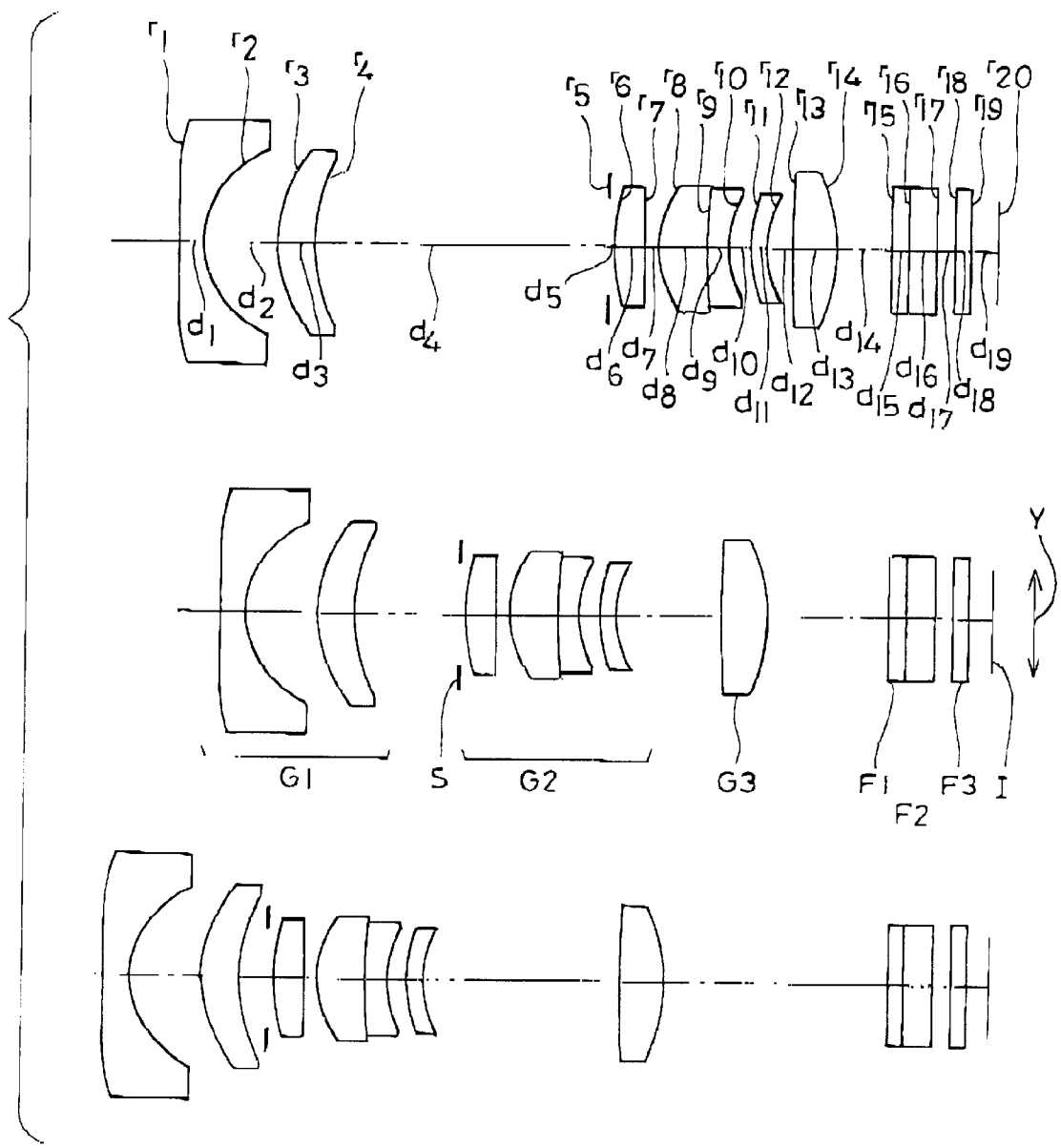

The eighth embodiment has a composition shown in FIG. 8, comprises a first negative lens unit G1, a second positive lens unit G2 and a third positive lens unit G3, and changes a magnification from a wide-angle position to a telephoto position by moving the first lens unit along an optical axis, and displacing the second lens unit G2 and the third lens unit G3 for different distances on the object side.

Furthermore, the first lens unit G1 consists of a negative lens element and a positive lens element, the second lens unit G2 consists of a positive lens element, a cemented lens component consisting of a positive lens element and a negative lens element, and a negative lens element, and the third lens unit consists of a single positive lens element.

In the eighth embodiment, an object side surface ($r_1$) of the most object side negative lens element in the first lens unit G1 and an image side surface ($r_{12}$) of the most image side negative lens element in the second lens unit G2 are aspherical surfaces, and the positive lens element in the third lens unit G3 has two spherical surfaces.

The eighth embodiment satisfies the conditions (1), (1-1), (2), (2-1), (3), (3-1), (4), (4-1), (5), (5-1), (6), (6-1), (8), (9), (9-1), (9-2) and (10).

Furthermore, the eighth embodiment satisfies also the conditions (11), (11-1), (12), (12-1), (13), (13-1), (14), (15) and (18).

Each of the zoom lens systems according to the above described first through embodiments is focused by moving the third lens unit G3 along the optical axis. Variations of the airspaces caused by focusing the zoom lens systems according to these embodiments on an object located at a distance of 100 mm (110 mm in the seventh embodiment) are listed in the numerical data.

Figure 13:
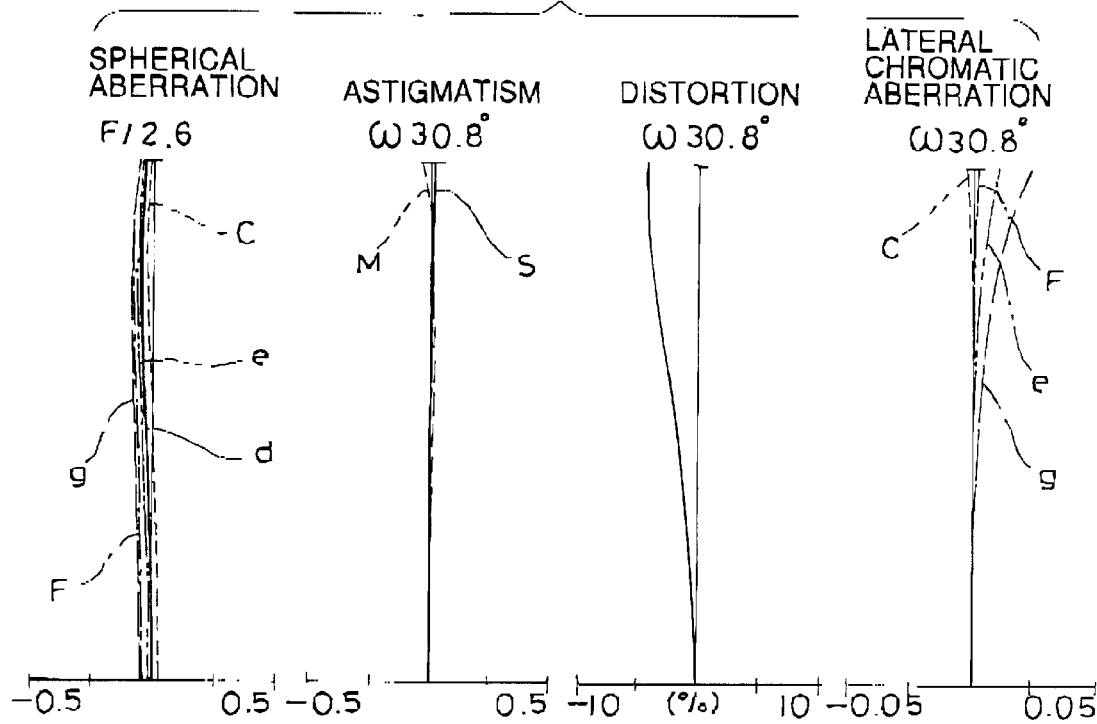
FIGS. 13 through 15 are curves showing aberration characteristics at a wide-angle position, an intermediate focal length and a telephoto position of the first embodiment of the present invention.
Figure 14:
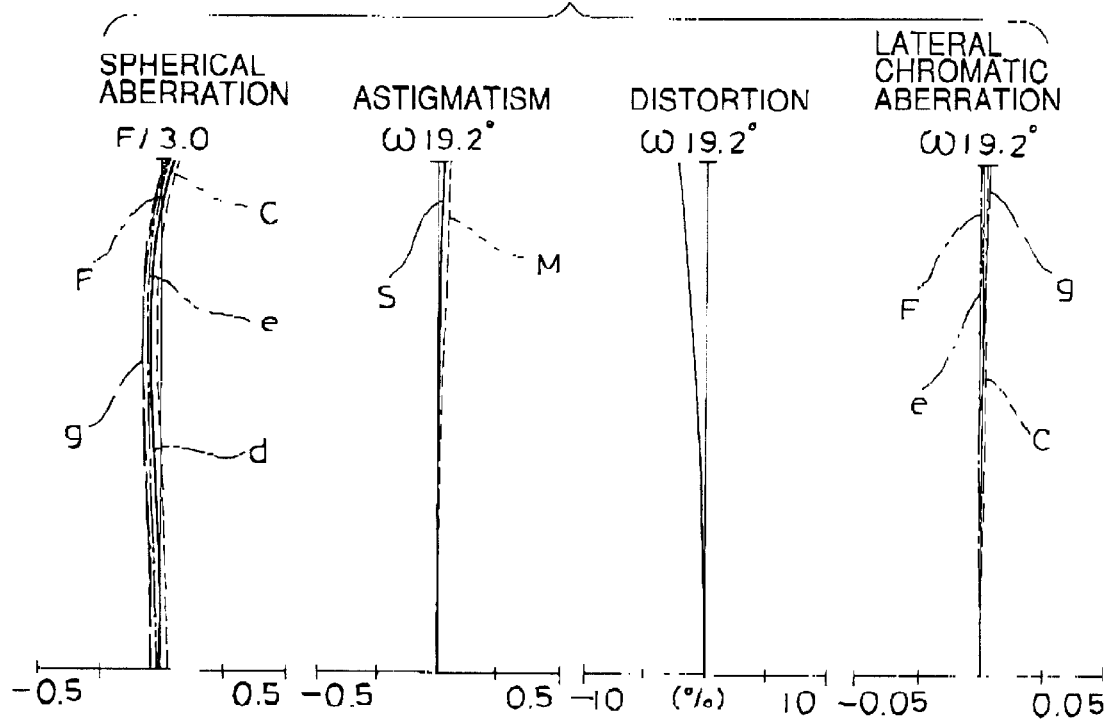
Figure 15:
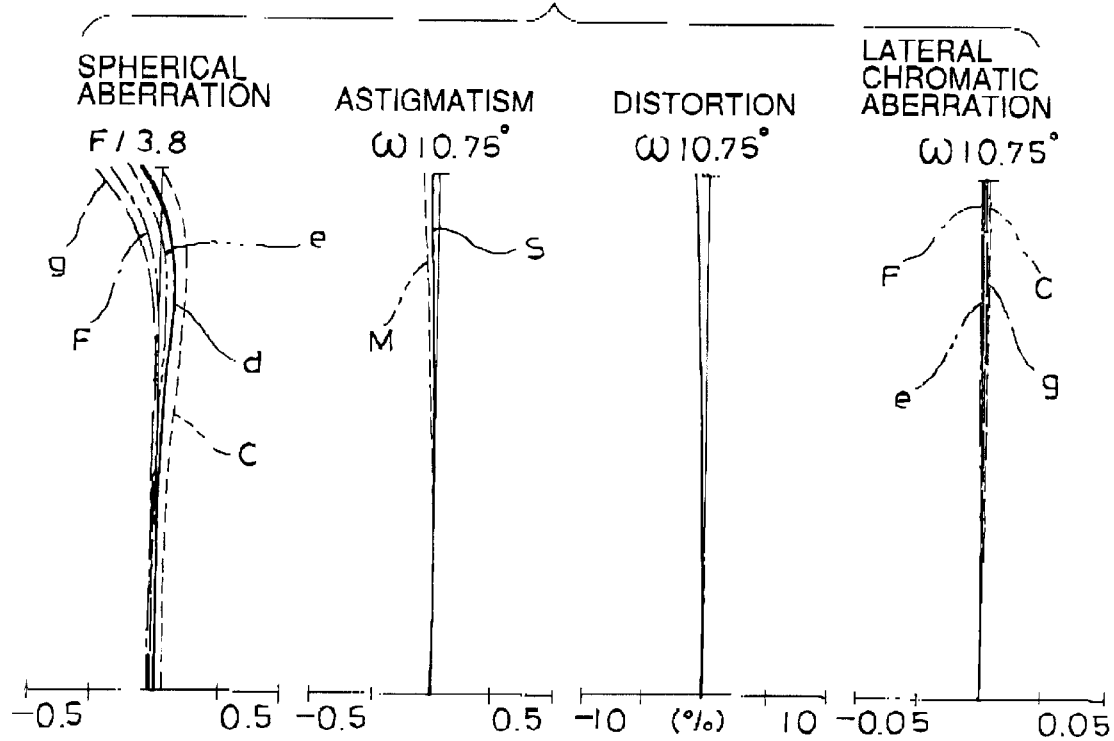

In the zoom lens system according to the first embodiment, aberrations are corrected favorably as shown in FIG. 13, FIG. 14 and FIG. 15 which visualize aberration conditions at the wide-angle position, an intermediate focal length and the telephoto position of the zoom lens system according when the zoom lens system is focused on an object located at an infinite distance.

Like aberrations in the first embodiment, aberrations are corrected favorably also in the zoom lens systems according to the other second through eighth embodiments.

Furthermore, zoom lens systems according to the third embodiment and eighth through fourteenth embodiments have the second composition according to the present invention.

Figure 9:
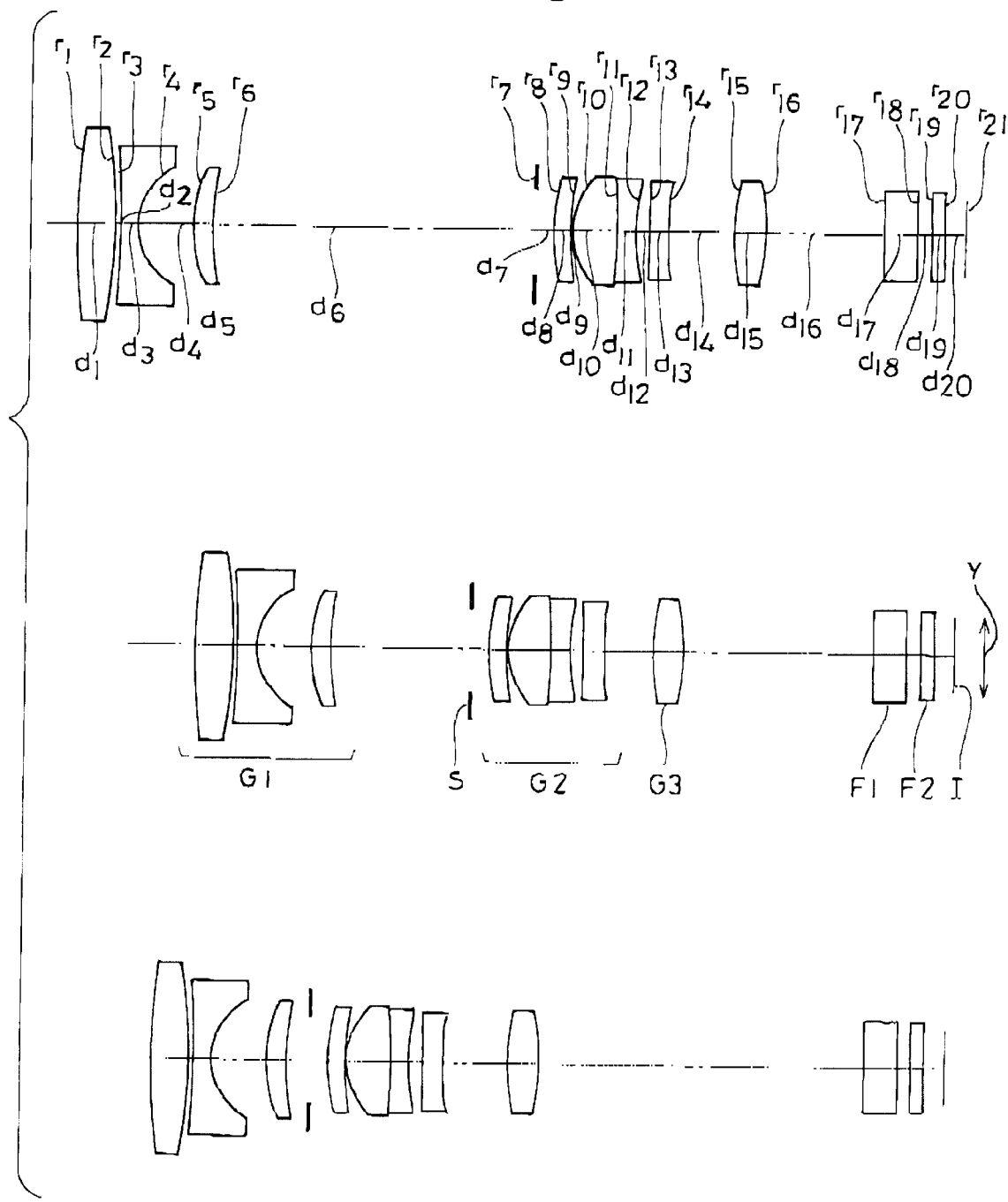

The ninth embodiment has a composition shown in FIG. 9, and comprises a first negative lens unit G1, a second positive lens unit G2 and a third positive lens unit G3.

Though the composition of the ninth embodiment is similar to that of the third embodiment, but is different in that a most object side surface ($r_8$) of the second lens unit G2 is also an aspherical surface in the composition of the ninth embodiment.

In the zoom lens system according to the ninth embodiment, an image side lens element in the first lens unit G1 and an image side lens element in the second lens unit G2 are aspherical lens elements, an object side lens element in the second lens unit G2 is also an aspherical lens element, and these lens elements have weak refractive power and are made of a plastic material. Furthermore, a spacing between the third lens unit G3 and an image surface I is widened so that a quick return mirror can be disposed.

The ninth embodiment satisfies the conditions (1), (2), (3), (6), (7), (8), (9), (11), (11-1), (12), (12-1), (13), (13-1), (14), (15), (16), (17), (18), (19), (21), (22) and (23).

Figure 10:
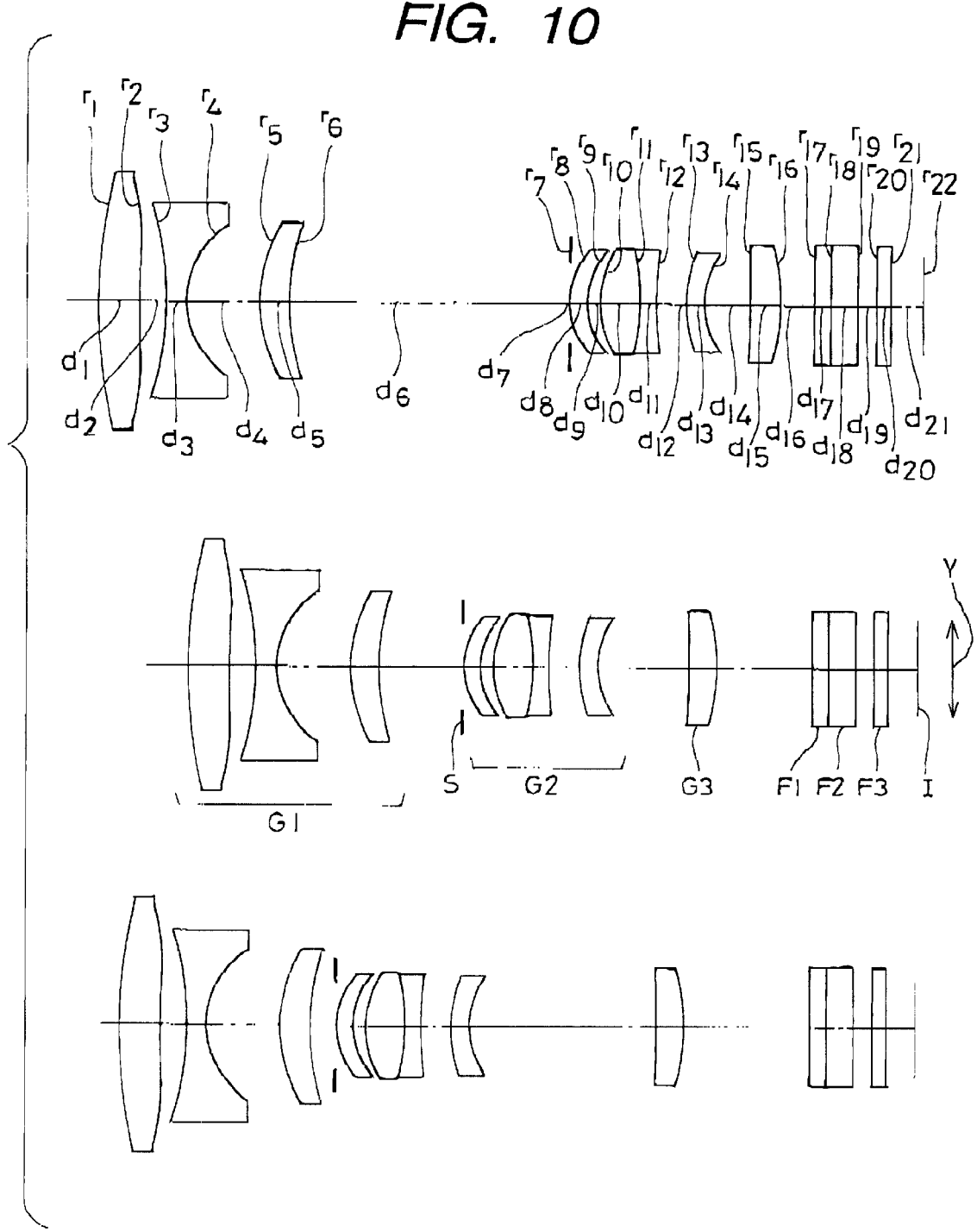

The tenth embodiment is a zoom lens system having a composition shown in FIG. 10 which is similar to that of the ninth or tenth embodiment.

In the tenth embodiment, aspherical surfaces are used as an image side surface ($r_2$) of a most object side lens element in a first lens unit G1, a most object side surface ($r_8$) of a most object side lens element and an object side surface ($r_{13}$) or a most image side lens element in a second lens unit. That is, the most object side lens element in the first lens unit G1, and the most object side lens element and the most image side lens element in the second lens unit are aspherical lens elements which are made of a plastic material.

The tenth embodiment satisfies the conditions (1), (2), (3), (4), (7), (8), (9), (10), (11), (12), (13), (13-1), (14), (14-1), (15), (18), (19), (21), (22) and (23).

Figure 11:
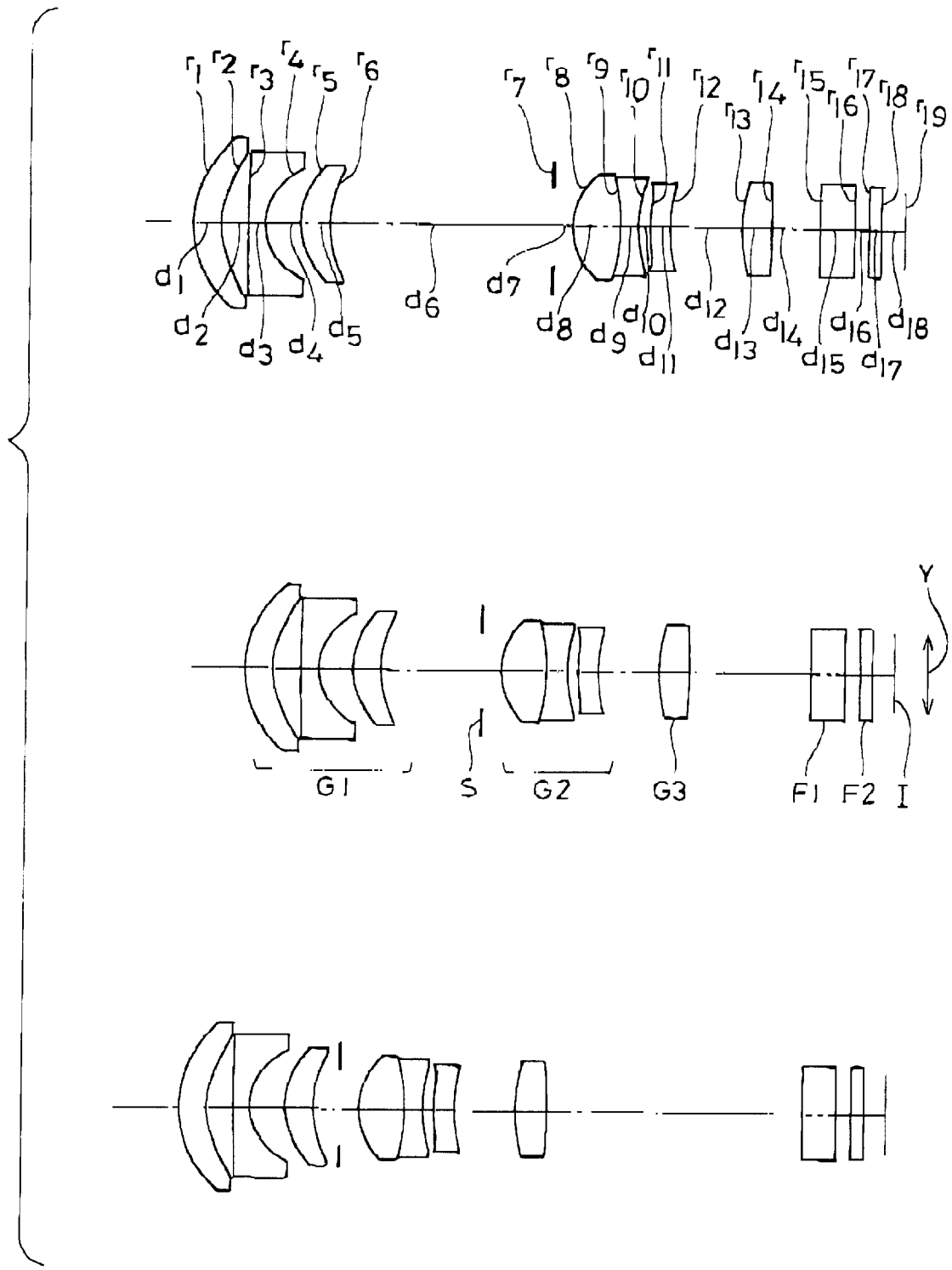

The eleventh embodiment has a composition shown in FIG. 11 which is similar to that of the third ninth or tenth embodiment.

In the eleventh embodiment, a first lens unit G1 consists of a positive lens element, a negative lens element and a positive lens element, a second lens unit G2 consists of a cemented lens component consisting of a biconvex lens element and a biconcave lens element, and a negative meniscus lens element, and a third lens unit G3 consists of a single positive lens element. That is, the second lens unit G2 has a composition which is different from that of the second lens unit in the ninth or tenth embodiment.

In the eleventh embodiment, aspherical surfaces are used as an image side surface ($r_2$) of a most object side lens element in the first lens unit G1, an image side surface ($r_8$) of a most object side lens element in the second lens unit G2 and an object side surface ($r_{11}$) of a most image side lens element in the second lens unit G2. The eleventh embodiment is configured to correct aberrations by omitting the most object side plastic aspherical surface in the second lens unit G2 of the tenth embodiment and using the aspherical surface as the object side surface of the cemented lens component. Accordingly, the second lens unit G2 is thinned to reduce a thickness of the zoom lens system in a collapsed condition.

The eleventh embodiment satisfies the conditions (1), (2), (3), (6), (8), (9), (10), (11), (11-1), (12), (12-1), (13), (13-1), (14), (14-1), (15), (18), (19) and (22).

Figure 12:
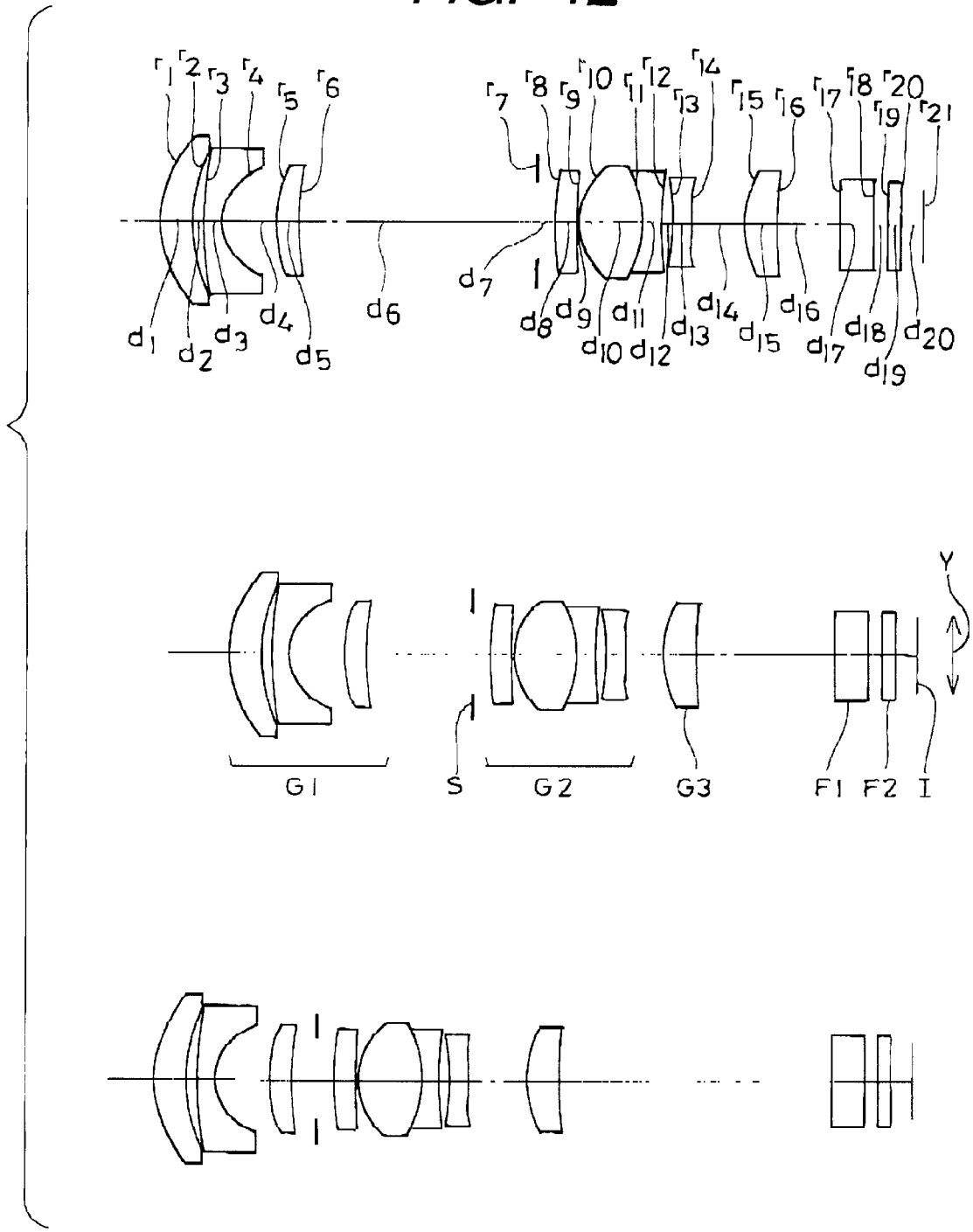

The twelfth embodiment is a zoom lens system having a composition shown in FIG. 12 which is similar to that of the third, eighth, ninth, tenth or eleventh embodiment.

The twelfth embodiment uses aspherical surfaces as an image side surface ($r_2$) of a most object side lens element and an object side surface ($r_5$) of a most object image side lens element in a first lens unit G1, and an object side surface ($r_8$) of a most object side lens element and an image side surface ($r_{14}$) of a most image side lens element in the second lens unit G2.

The zoom lens system according to the twelfth embodiment is inexpensive since the zoom lens system uses plastic aspherical lens elements which are disposed on the object side and the image aide in the first lens unit G1, and the object side and the image side in the second lens unit G2.

The twelfth embodiment satisfies the conditions (1), (2), (3), (4), (6), (7), (8), (9), (10), (11), (11-1), (12), (12-1), (13), (13-1), (13-2), (14), (14-1), (15), (18), (19), (21), (22) and (23).

Figure 16:
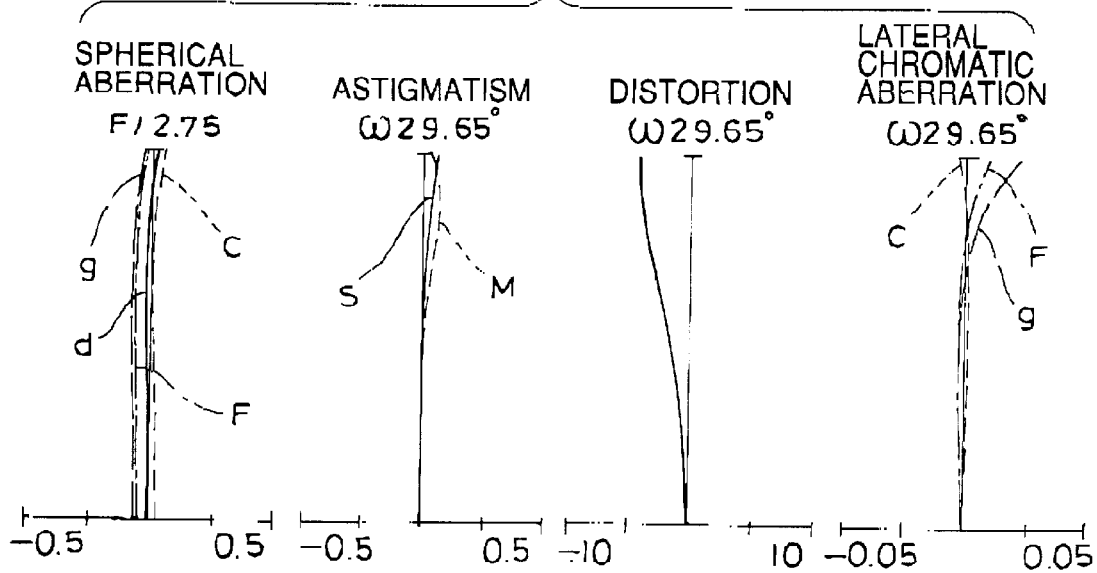
FIGS. 16 through 18 are curves showing aberration characteristics at a wide-angle position, intermediate focal length and a telephoto position of the third embodiment of the present invention.
Figure 17:
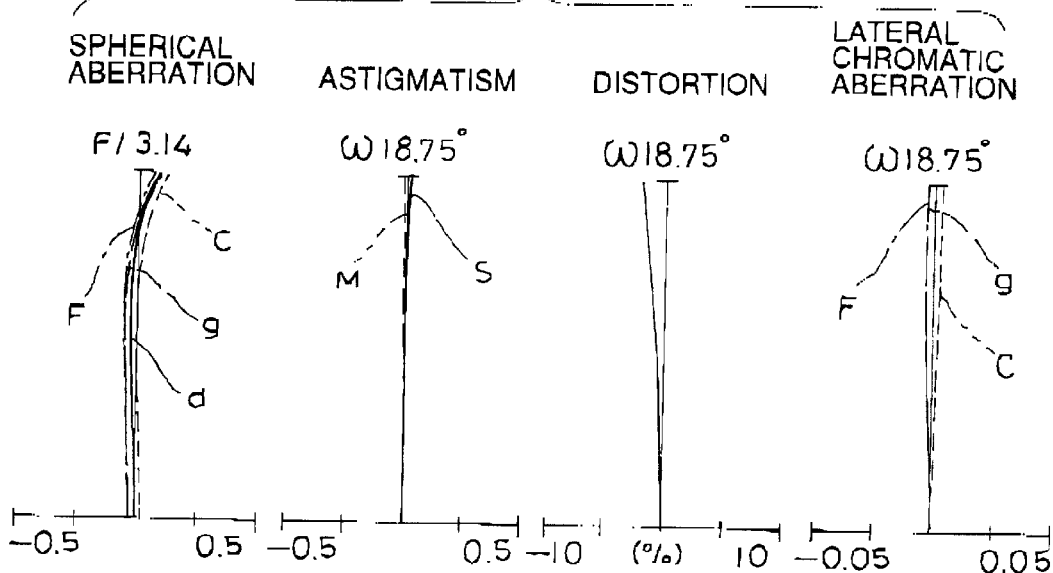
Figure 18:
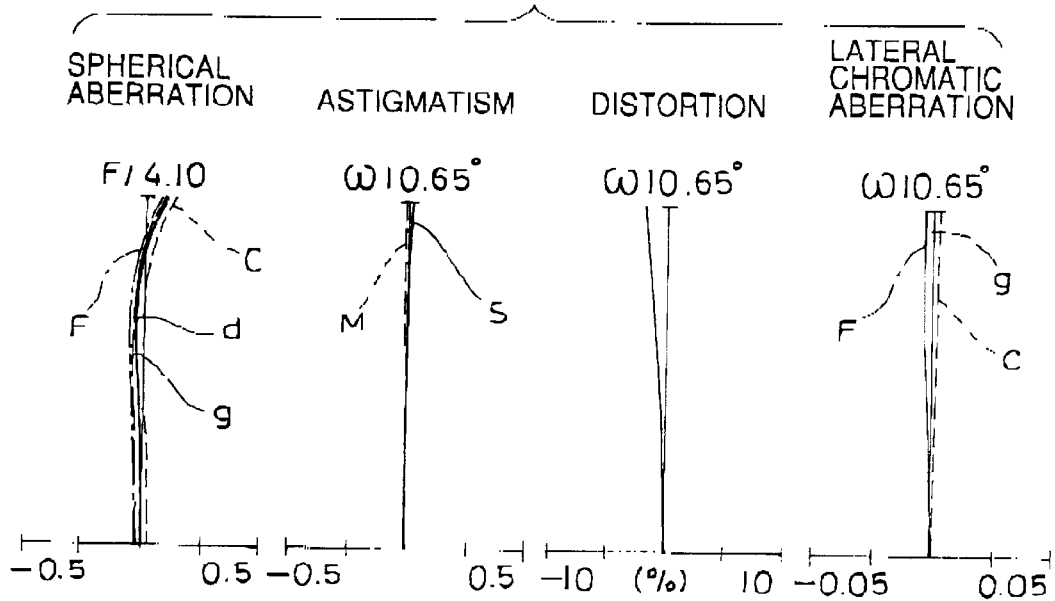

In the zoom lens system according to the ninth embodiment, aberrations are corrected favorably as shown in FIG. 16, FIG. 17 and FIG. 18 which visualize aberration conditions at the wide-angle position, an intermediate focal length and the telephoto position in a condition where the zoom lens system is focused on an object located at an infinite distance.

Aberrations are corrected favorably in the zoom lens systems according to the other ninth, tenth, eleventh and twelfth embodiments as in the ninth embodiment.

In FIG. 1 through FIG. 12, a reference numeral represents an aperture stop, reference symbols F1, F2 and like designate filters such as an infrared cut filter, an optical low pass filter and the like, and a reference symbol I denotes an image surface. Furthermore, a diagonal length of the image surface I is represented by Y.

Shapes of the aspherical surfaces used in the embodiments are expressed by the following formula:

$$x = (y^2/r)/\left[1 + \{1 - (1+K)(y/r)^2\}^{1/2}\right] + A_2 y^2 + A_4 y^4 + A_6 y^6 + A_8 y^8 + \ldots$$

wherein a light travelling direction along an optical axis is taken as an x axis, a direction perpendicular to the optical axis is taken as a y axis, a reference symbol r represents a radius of curvature on a reference spheres a reference symbol K designates a conical coefficient, and reference symbols $A_2$, $A_4$, $A_6$, $A_8$, . . . denotes aspherical surface coefficients.

Figure 19:
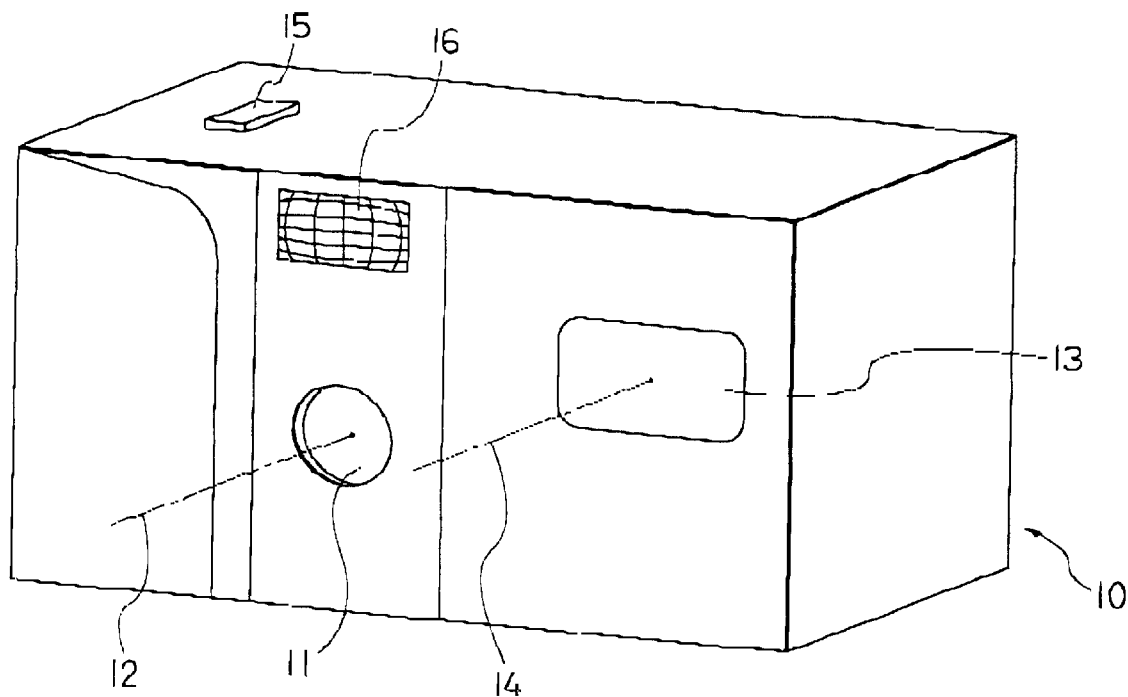
FIG. 19 is a perspective view of an image pickup apparatus according to the present invention as seen from a front.
Figure 20:
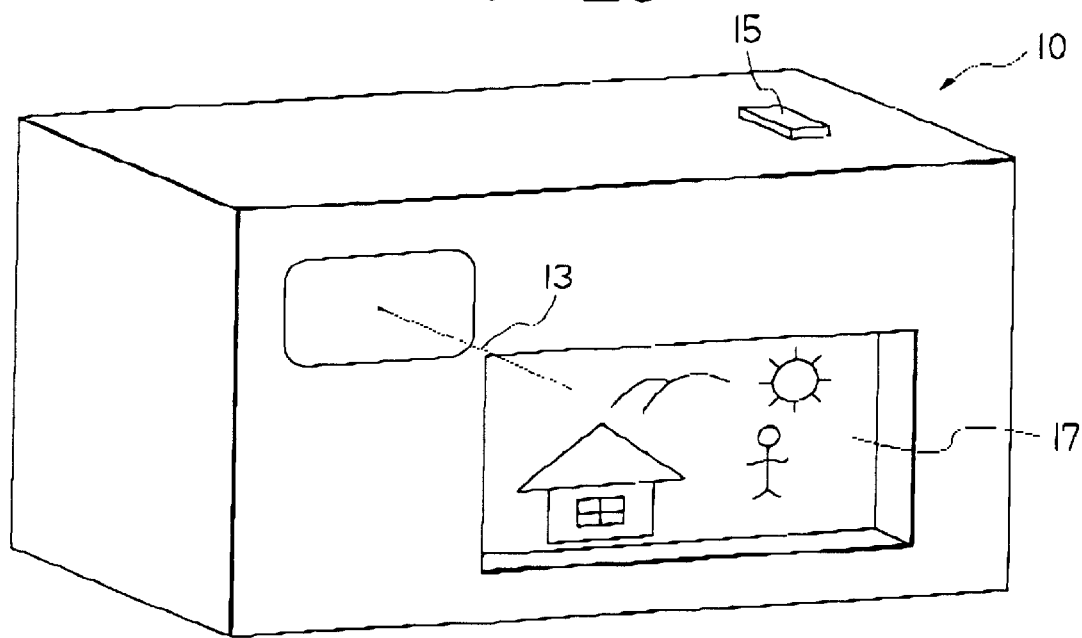
FIG. 20 is a perspective view of the image pickup apparatus according to the present invention as seen from a rear.
Figure 21:
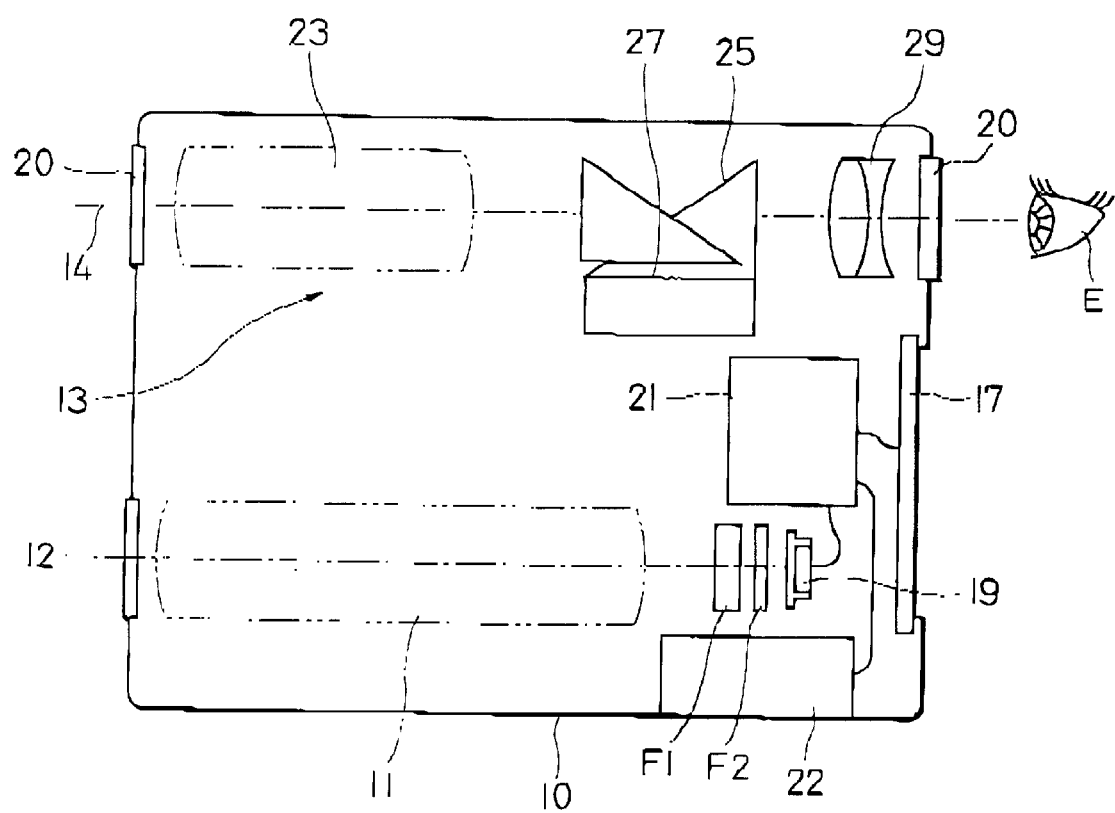
FIG. 21 is a sectional view of the image pickup apparatus according to the present invention.

FIG. 19 through FIG. 21 are conceptional diagrams of a digital camera as an embodiment of the image pickup apparatus according to the present invention. FIG. 19 is a front perspective view showing an appearance of a digital camera 10. FIG. 20 is a rear perspective view and FIG. 21 is a sectional view showing a configuration of the digital camera 10. The digital camera 10 shown in the drawings comprises a photographic optical system 11 having a photographic optical path 12, a view finder optical system 13 having a view finder optical path 14, a shutter button 15, a flash 16 and a liquid crystal monitor 17, and when the shutter button 15 is depressed photographing is carried out through the photographic optical system 11 which is, for example, the zoom lens system according to the first embodiment of the present invention. An image of an object is formed on an image pickup surface of an electronic image pickup device (CCD) 19 by way of filters F1 and F2 such as a low pass filter, an infrared cut filter and the like. The image of the object which is received by the CCD 19 is displayed as an electronic image on the liquid crystal display monitor 17 by way of processing means 21. Furthermore, connected to this processing means 21 is recording means 22 which can record the photographed electronic image. The recording means 22 may be disposed separately from the processing means 21 or configured to electronically record and write an image on a floppy disk, a memory card, an MD or the like. The digital camera 10 may be configured as a silver salt camera in which a silver salt film is disposed in place of the CCD 19.

Furthermore, disposed in the view finder optical path 14 is a view finder objective optical system 23. An image of an object is formed by the view finder objective optical system 23 on a visual field frame 27 of a Porro prism 25 which is an image erecting member. Disposed after this Porro prism 25 is an eyepiece optical system 29 which leads an erected image to an observer's eyeball E. In addition, cover members 20 are disposed on a side of incidence of the view finder objective optical system 23 and on a side of emergence of the eyepiece optical system 29 respectively.

The digital camera 10 which is configured as described above has high optical performance and can be manufactured at a low cost since the photographic optical system 11 is a zoom lens system which has a large field angle, favorably corrected aberrations, high brightness and a back focal length long enough to allow filters and the like to be disposed. That is, photographic optical system 23 shown in FIG. 21 is the zoom lens systems according to the first embodiment of the present invention which comprises the first lens unit G1, the second lens unit G2 and the third lens unit G3. A reference symbol S represents an aperture stop, and reference symbols F1 and F2 designate filters.

Though the digital camera is shown in FIG. 19 through FIG. 21 as an example of the image pickup apparatus according to the present invention, a video camera which uses the zoom lens system according to the present invention can be mentioned as another example of the image pickup apparatus according to the present invention. Furthermore, the image pickup apparatus according to the present invention is usable as image input means attached to an information processing apparatus such as a personal computer and a communicating apparatus such as a telephone, a portable telephone in particular.

The present invention makes it possible to realize a zoom lens system which has a small thickness in a collapsed condition, an excellent accommodable property, a high magnification and high imaging performance even in a rear focus mode. Furthermore, the present invention cameras by using the zoom lens system according to the present invention.

What is claimed is:

1. A zoom lens system comprising in order from the object side; a first lens unit having negative refractive power; a second lens unit having positive refractive power; and a third lens unit having positive refractive power, wherein a magnification is changed from a wide-angle position to a telephoto position by moving the second lens unit along an optical axis on the object side and moving the third lens unit along the optical axis, wherein said second lens unit consists of four lens elements including, in order from the object side, two positive lens elements and a negative lens element and satisfies the following conditions (1) and (2):

$$1.3 < |\beta 23T| < 2.0 \quad (1)$$

$$0.25 < |f2/f3| < 1.5 \quad (2)$$

wherein a reference symbol β23T represents a total magnification of the second lens unit and the third lens unit at the telephoto position, and reference symbols f2 and f3 designate focal lengths of the second lens unit and the third lens unit respectively.

2. The zoom lens system according to claim 1, wherein said second lens unit comprises, in order from the object side, a positive lens element, and a cemented lens component consisting of a positive lens element and a negative lens element.

3. The zoom lens system according to claim 1 or 2 satisfying the following condition (3):

$$|fw/f_{2R}| < 0.29 \quad (3)$$

wherein a reference symbol $f_{2R}$ represents a focal length of a most image side lens component in said second lens unit and a reference symbol fw designates a focal length of the zoom lens system as a whole at the wide-angle position.

4. The zoom lens system according to claim 1 or 2, wherein the second lens unit has at least an aspherical surface.

5. The zoom lens system according to claim 4, wherein an aspherical surface is disposed on any positive lens component in the second lens unit.

6. The zoom lens system according to claim 4, an aspherical surface is disposed on a most image side lens element in the second lens unit.

7. The zoom lens system according to claim 1 or 2, wherein the zoom lens system is focused on an object located at a near position by moving the third lens unit on the object side.

8. The zoom lens system according to claim 7 satisfying the following condition (6):

$$0.8 < f3/fT < 2.8 \quad (6)$$

wherein reference symbol f3 represents a focal length of the third lens unit and a reference symbol fT designates a focal length of the zoom lens system as a whole at the telephoto position.

9. The zoom lens system according to claim 1 or 2, wherein the third lens unit consists of a positive single lens element.

10. The zoom lens system according to claim 7, wherein the third lens unit has spherical surfaces only.

11. The zoom lens system according to claim 1 or 2, wherein the first lens unit comprises at least a negative lens element and a positive lens element.

12. The zoom lens system according to claim 3, wherein the first lens unit consists, in order from the object side, of two negative lens elements and a positive lens element or a negative lens element and a positive lens element.

13. The zoom lens system according to claim 11, wherein the first lens unit consists, in order from the object side, of a positive lens element, two negative lens elements and a positive lens element or a positive lens element, a negative lens element and a positive lens element.

14. The zoom lens system according to claim 1 or 2, wherein the first lens unit consists, in order from the object side, of a positive lens element and two negative lens elements.

15. The zoom lens system according to claim 1 or 2, wherein the first lens unit has at least an aspherical surface.

16. The zoom lens system according to claim 1 or 2, wherein the third lens unit is moved so as to prolong a distance between the third lens unit and an image surface to change a magnification from the wide-angle position to the telephoto position.

17. The zoom lens system according to claim 16 satisfying the following condition (9):

$$0.4 < |\Delta X3|/Y < 4 \quad (9)$$

wherein a reference symbol ΔX3 represents a displacement distance of the third lens unit relative to the image surface for the magnification change from the wide-angle position to the telephoto position when the zoom lens system is focused on an object located at an infinite distance and a reference symbol Y designates a diagonal length of an effective image pickup area of an image pickup device.

18. The zoom lens system according to claim 17 satisfying the following condition (10):

$$0 < \Delta X3/\Delta X2 < 15 \quad (10)$$

wherein a reference symbol ΔX2 represents a displace distance of the second lens unit relative to the image surface for the magnification change from the wide-angle position to the telephoto position when the zoom lens system is focused on the object located at the infinite distance.

19. The zoom lens system according to claim 1 or 2, wherein the zoom lens system is focused by moving the third lens unit along the optical axis.

20. A zoom lens system comprising in order from the object side: a first lens unit having negative refractive power; a second lens unit having positive refractive power; and a third lens unit having positive refractive power, wherein at least said third lens unit is moved so as to prolong a distance between said third lens unit and an image surface to change a magnification from a wide-angle position to a telephoto position, and wherein said third lens unit consists of a single lens component and satisfies the following conditions (11), (12), (13) and (14):

$$|fw/f_{2R}| < 0.1 \quad (11)$$

$$0.89 < f3/fT < 2.8 \quad (12)$$

$$1.1 < |\beta 23T| < 2 \quad (13)$$

$$1/\beta 2T < 0.25 \quad (14)$$

wherein reference symbol $f_{2R}$ represents a focal length of a most image side lens element in said second lens unit, reference symbol f3 designates a focal length of said third lens unit, reference symbol fw represents a focal length of the lens system as a whole at wide-angle position, reference symbol $f_T$ represents a focal length of the lens system as a whole at a telephoto-angle position, reference symbol β 23T denotes a total magnification of said second lens unit and said third lens unit at the telephoto position, and reference symbol β2T represents a magnification of said second lens unit at the telephoto position.

21. The zoom lens system according to claim 20 satisfying a condition (11-1) mentioned below in place of said condition (11), a condition (12) mentioned below in place of said condition (12), a condition (13) mentioned below in place of said condition (13) and/or a condition (14-1) mentioned below in place of said condition (14), $$|fw/f_{2R}|<0.05 \tag{11-1}$$

$$1.1<f3/fT<2 \tag{12-1}$$

$$1.2<|\beta 23T|<1.8 \tag{13-1}$$

$$1/\beta 2T<0.1 \tag{14-1}$$

22. The zoom lens system according to claim 20 or 21, wherein said second lens unit comprises, in order from the object side, a single lens element, a cemented lens component and a single lens element, and wherein said lens element on the most object side has an aspherical surface.

23. The zoom lens system according to claim 22, wherein said cemented lens component in said second lens unit has a meniscus shape having an convex surface on the object side and said lens element on the most object side in said second lens unit surtifies a following condition (21), $$|fw/f_{2F}|<0.1 \tag{21}$$

where a reference symbol $f_{2F}$ represents a focal length of said lens element on the most object side in said second lens unit and a reference symbol fw designates a focal length of the zoom lens system as a whole at the wide-angle position.

24. The zoom lens system according to claim 20 or 21, wherein said second lens unit consists, in order from the object side, of a cemented lens component and a single lens element, and wherein said cemented lens component has a most object side aspherical surface.

25. The zoom lens system according to claim 20 or 21, wherein said first lens unit consists, in order from the object side, of a single lens element which has an aspherical surface, a single lens element which has negative refractive power and a positive meniscus lens component which has a convex surface on the object side and said lens element of the most object side in said first lens unit satisfies a following condition (22):

$$|f_1/f_{11}|<0.2 \tag{22}$$

wherein a reference symbol $f_{11}$ represents a focal length of said lens element of the most object side in said first lens unit and a reference symbol $f_1$ designates a focal length of said first lens unit.

26. The zoom lens system according to claim 20 or 21, wherein said first lens unit consists, in order from the object side, of a biconvex lens element, a single lens element which has a strongly concave surface on the image side and negative refractive power, and a lens element which has an aspherical surface and satisfies a following condition (23):

$$|f_1/f_{13}|<0.2 \tag{23}$$

wherein a reference symbol $f_{13}$ represents a focal length of said lens element of the most image side in said first lens unit and a reference symbol $f_1$ designates a focal length of said first lens unit.

27. The zoom lens system according to claim 20 or 21, wherein said first lens unit consists of a single lens element which has an aspherical surface a single lens element which has a concave surface on the image side and negative refractive power, and a lens element which has an aspherical surface, and said lens elements of the most object side and the most image side in said first lens unit satisfy following conditions (22) and (23), $$|f_1/f_{11}|<0.2 \tag{22}$$

$$|f_1/f_{13}|<0.2 \tag{23}$$

wherein reference symbols $f_{11}$ and $f_{13}$ represent focal lengths of said lens elements of the most object side and the most image side in said first lens unit respectively, and a reference symbol $f_1$, designate a focal length of said first lens unit.

28. The zoom lens system according to claim 20 or 21, wherein said first lens unit consists of a lens element which has an aspherical surface, a concave surface on the image side and negative refractive power, and a meniscus lens element which has a convex surface on the image side.

29. The zoom lens system according to claim 23 satisfying the following condition (19):

$$|fw/fp|<0.05 \tag{19}$$

wherein a reference symbol fp represents a focal length of a plastic lens element and a reference symbol fw designates a focal length of the zoom lens system as a whole at the telephoto position.

30. The zoom lens system according to claim 20 or 21, wherein the zoom lens system is focused on an object located at a near position by moving said third lens unit on the object side.

31. The zoom lens system according to claim 20 or 21, wherein a most image side lens element in said second lens unit is a lens element which has an aspherical surface.

32. An image pickup apparatus comprising: a zoom lens system; and an image pickup device, wherein the zoom lens system comprises in order from the object side; a first lens unit having negative refractive power; a second lens unit having positive refractive power; and a third lens unit having positive refractive power, wherein a magnification is changed from a wide-angle position to a telephoto position by moving the second lens unit along an optical axis on the object side and moving the third lens unit along the optical axis, and wherein said second lens unit consists of four lens elements including, in order from the object side, two positive lens elements and a negative lens element and satisfies the following conditions (1) and (2):

$$1.3<|\beta 23T|<2.0 \tag{1}$$

$$0.23<|f2/f3|<1.5 \tag{2}$$

wherein a reference symbol β23T represents a total magnification of the second lens unit and the third lens unit at a telephoto position, and reference symbols f2 and f3 designate focal lengths of the second lens unit and the third lens unit respectively.

33. An image pickup apparatus comprising: a zoom lens system; and an image pickup device, wherein the zoom lens system comprises in order from the object side: a first lens unit having negative refractive power; a second lens unit having positive refractive power; and a third lens unit having positive refractive power, wherein a magnification is changed from a wide-angle position to a telephoto position at least by moving said third lens unit so as to prolong a distance between said third lens unit and an image surface, and wherein said third lens unit consists of a single positive lens component and satisfies the following conditions (11), (12), (13) and (14):

$$|fw/f_{2R}|<0.1 \tag{11}$$

$$0.89<f3/fT<2.8 \tag{12}$$

$$1.1<|\beta 23T|<2.0 \tag{13}$$

$$1/\beta 2T<0.25 \tag{14}$$

wherein a reference symbol $f_{2R}$ represents a focal length of the most image side lens element in said second lens unit, a reference symbol f3 designates a focal length of said third lens unit, a reference symbol $\beta 23T$ denotes a total magnification of said second lens unit and said third lens unit, and a reference symbol $\beta 2T$ represents a magnification of said second lens unit at the telephoto position, and reference symbols fw and fT designate a focal length of said zoom lens system as a whole at the wide-angle position and tel position respectively.

* * * * *